United States Patent [19]

Wang et al.

[11] Patent Number: 6,014,720

[45] Date of Patent: *Jan. 11, 2000

[54] DYNAMICALLY SIZING A BUS TRANSACTION FOR DUAL BUS SIZE INTEROPERABILITY BASED ON BUS TRANSACTION SIGNALS

[75] Inventors: Tsan-Kuen Wang, Cupertino; Mustafiz Choudhury, Sunnyvale, both of Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/851,352

[22] Filed: May 5, 1997

[51] Int. Cl.[7] .................................................. G06F 13/40
[52] U.S. Cl. ........................................... 710/127; 710/129
[58] Field of Search ..................................... 395/307, 309; 710/127, 129

[56] References Cited

U.S. PATENT DOCUMENTS

| | | | |
|---|---|---|---|
| 4,663,732 | 5/1987 | Robinson | 711/157 |
| 5,233,616 | 8/1993 | Callander | 371/37.7 |
| 5,373,467 | 12/1994 | Wang | 395/306 |
| 5,388,227 | 2/1995 | McFarland | 395/307 |
| 5,446,845 | 8/1995 | Arroyo et al. | 395/307 |
| 5,594,877 | 1/1997 | Lentz et al. | 395/306 |
| 5,627,975 | 5/1997 | Bryant et al. | 395/307 |
| 5,649,127 | 7/1997 | Hang | 395/307 |
| 5,651,137 | 7/1997 | MacWilliams et al. | 711/141 |
| 5,673,396 | 9/1997 | Smolansky et al. | 395/307 |
| 5,768,546 | 6/1998 | Kwon | 395/307 |

Primary Examiner—Thomas C. Lee
Assistant Examiner—Harold Kim
Attorney, Agent, or Firm—Blakely, Sokoloff, Taylor & Zafman LLP

[57] ABSTRACT

A circuit dynamically sizes a bus transaction on a bus of a first size. The bus is formed by multiple signals. The circuit comprises a separator, a selecting element, and a combining element. The separator separates the bus signals into two groups of signals of a second size. The selecting element selects one of the two separated groups in response to a control signal indicating the data size of the bus transaction. The combining element combines a separated group of signals and a selected group of signals.

20 Claims, 15 Drawing Sheets

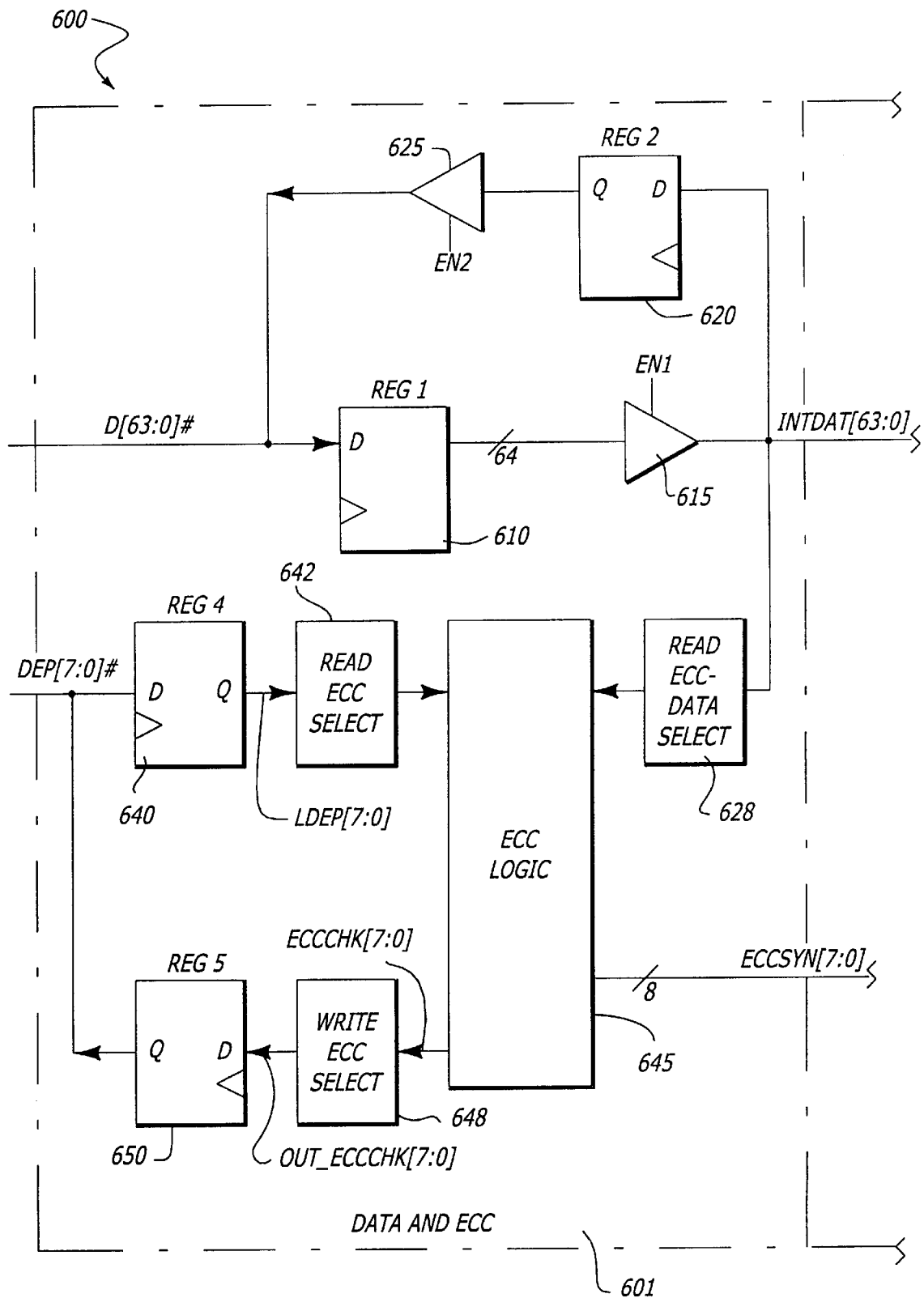
FIG. 6_1

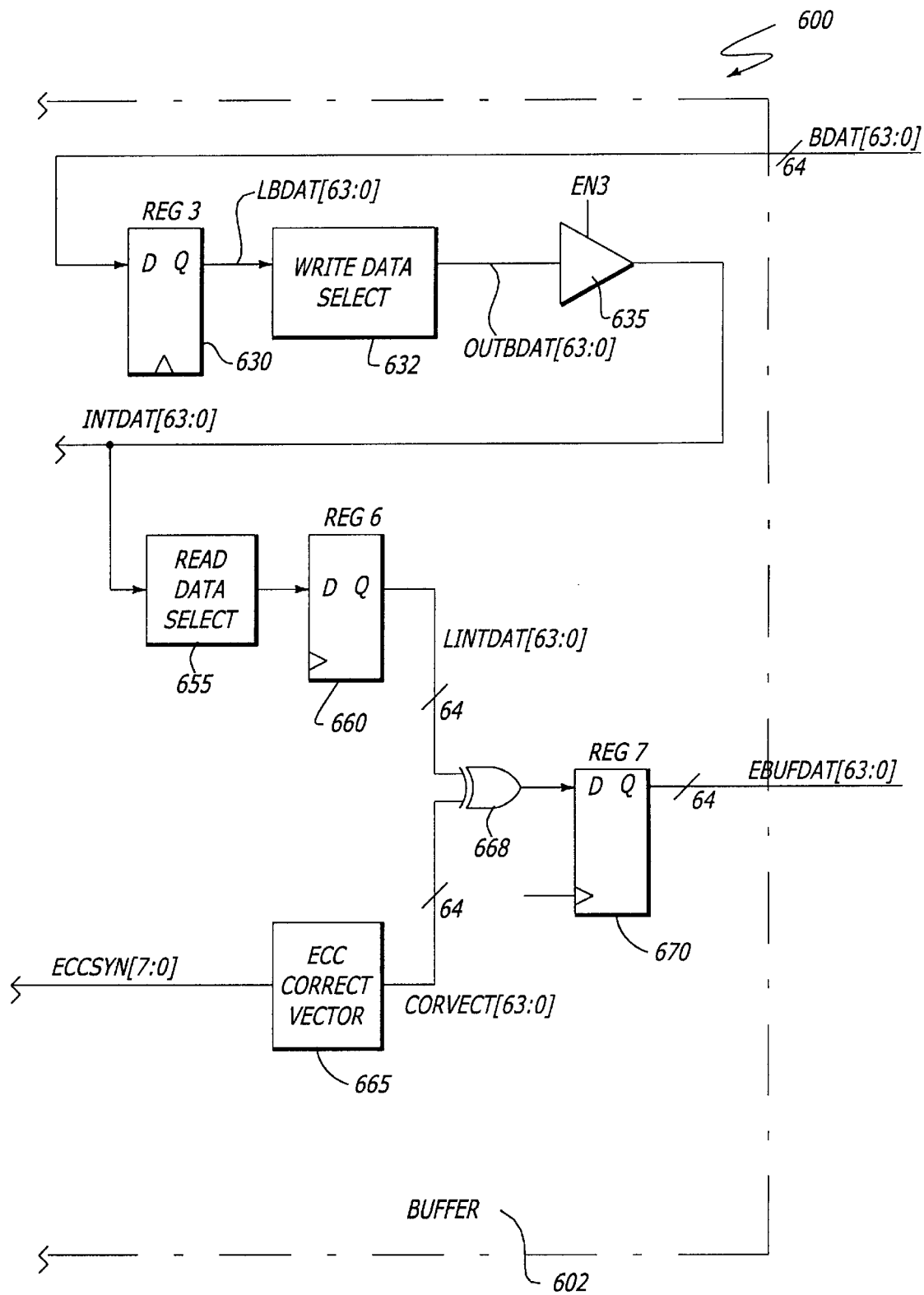
FIG. 6_2

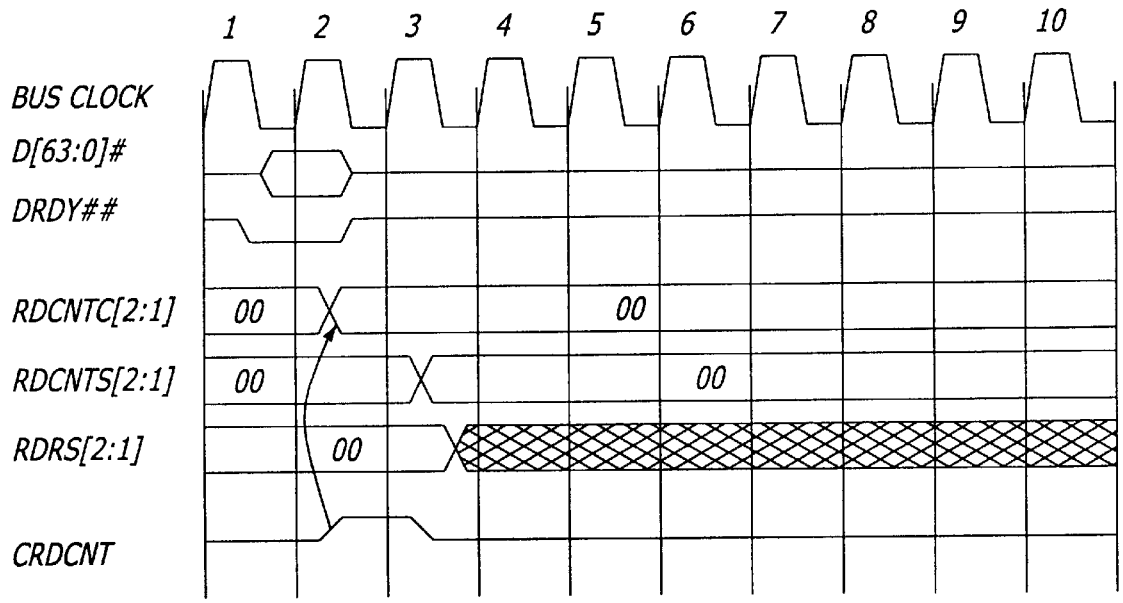
*FIG. 19* A
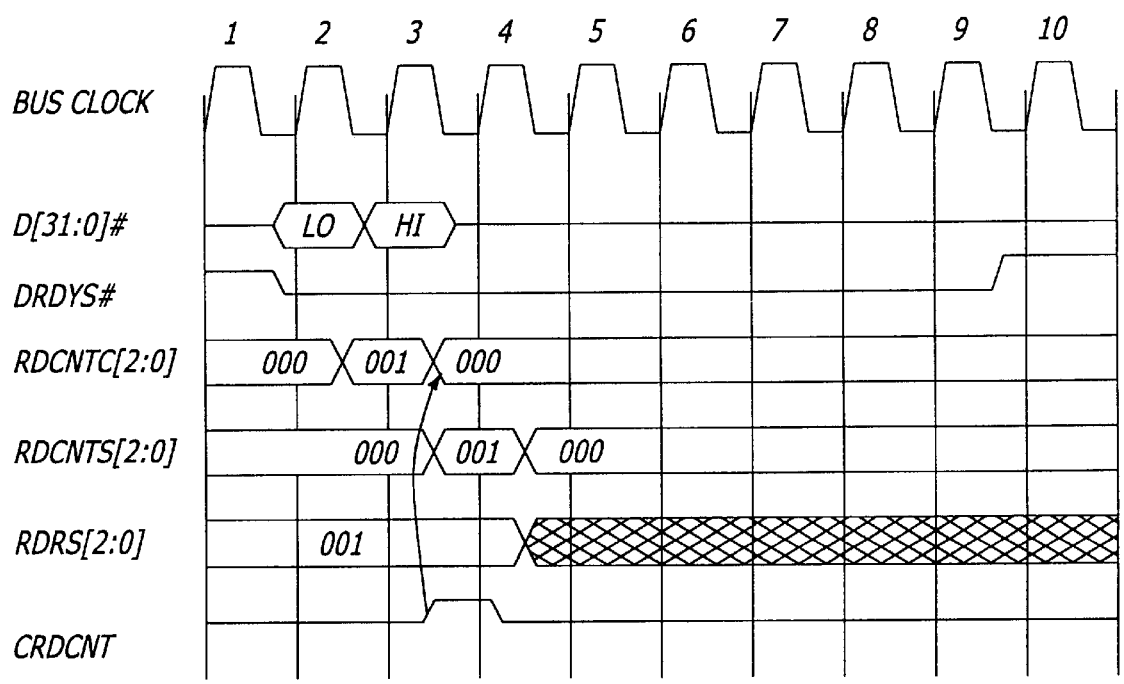
*FIG. 19* B

DYNAMICALLY SIZING A BUS TRANSACTION FOR DUAL BUS SIZE INTEROPERABILITY BASED ON BUS TRANSACTION SIGNALS

BACKGROUND OF THE INVENTION

1. Field of the Invention

This invention relates to the dynamic sizing of bus transactions having multiple data sizes. In particular, the invention relates to dynamic sizing for 32-bit data bus and 64-bit/32-bit inter-operability in a 64-bit processor.

2. Description of Related Art

In a typical microprocessor architecture, the size of the data bus is directly related to the processor performance. Modern high performance microprocessors typically have a data bus size of 64-bit or above. The large data bus size increases the data transfer rate and provides fast processing in instruction and operand fetching. An example of a 64-bit processor is the PENTIUM® processor produced by Intel Corporation of Santa Clara, Calif.

To effectively utilize this large data bus, it is desirable that external components have a comparable data size. However, many devices are designed for smaller data sizes, such as 32-bit size. When these devices are interfaced to a 64-bit processor, additional data bus steering logic circuitry is necessary to perform the data switching to accommodate both 64-bit and 32-bit devices. This additional circuitry increases hardware and power consumption.

Furthermore, in applications requiring compactness and lower power consumption such as mobile computing and notebook computers, it is important to keep the form factor small by having a smaller data bus size without significantly sacrificing the system throughput. Reducing the external data bus size while still maintaining the internal bus size provides a solution for such applications.

In other applications, upgradability is important. In these applications, the system is initially designed for a smaller data size. As the application becomes more mature or customers demand higher throughput, the system is then upgraded to a larger size data configuration. It is costly to replace the interface circuitry for such an upgrade.

It is therefore desirable to have a method and apparatus for dynamic sizing of a bus transaction to provide flexibility and dual bus size inter-operability.

SUMMARY OF THE INVENTION

The present invention discloses a circuit for dynamically sizing a bus transaction on a bus of a first size. The bus is formed by multiple signals. The circuit comprises a separator which is coupled to the bus signals, a selecting element, and a combining element which is also coupled to the selecting element. The separator separates the bus signals into two groups of a second size: a first group and the second group. The selecting element selects one of the first group of signals and a second group of signals, in response to a control signal indicating the data size of the bus transaction. The combining element combines one of the separated groups of signals and one of the selected groups of signals.

BRIEF DESCRIPTION OF THE DRAWINGS

The features and advantages of the present invention will become apparent from the following detailed description of the present invention in which:

FIG. 2A is a timing diagram illustrating a write transaction in the 64-bit transfer mode.

FIG. 2B is a timing diagram illustrating a write transaction in the 32-bit transfer mode.

FIG. 5 is a circuit diagram illustrating a data bus size configuration upon power on.

FIGS. 6-1 and 6-2 are block diagrams showing one embodiment of a Dynamic Sizing Circuit in accordance to the teachings of the present invention.

FIG. 19A is a timing diagram illustrating a tracking of partial line read data transfer for a 64-bit mode.

FIG. 19B is a timing diagram illustrating a tracking of partial line read data transfer for a 32-bit mode.

DESCRIPTION OF THE PRESENT INVENTION

The present invention discloses a method and apparatus for dynamic sizing of bus transactions to provide 64-bit and 32-bit inter-operability in a 64-bit microprocessor. The dynamic sizing provides flexibility in data bus interfacing.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
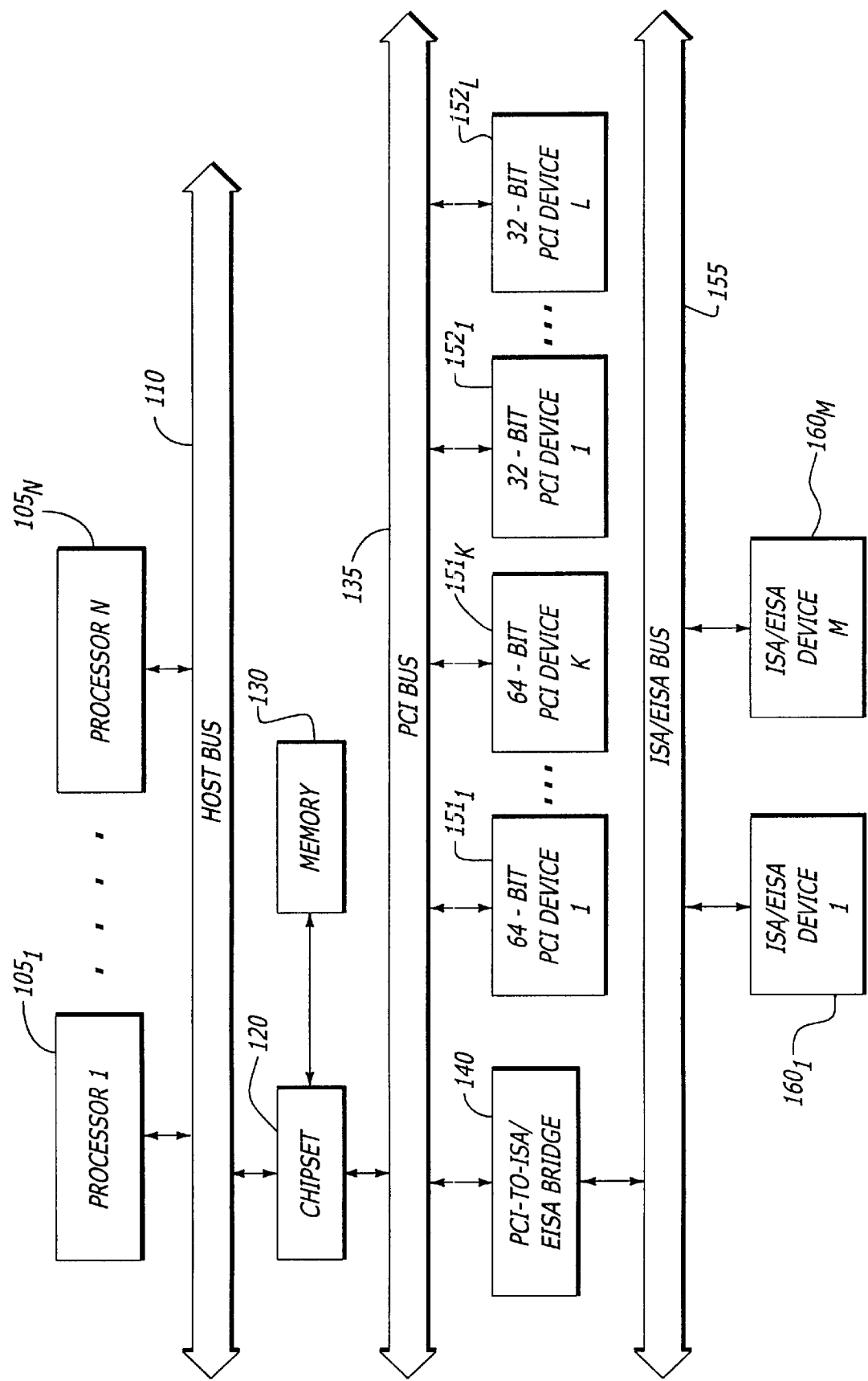
FIG. 1 is a block diagram illustrating a computer system utilizing the present invention.

Referring to FIG. 1, an illustrative embodiment of a computer system utilizing the present invention is shown. The computer system 100 comprises one or more processors $105_1$–$105_N$ ("N" being a positive whole number) and a main memory element 130 (e.g., dynamic random access memory "DRAM", static random access memory "SRAM", etc.) coupled together by a chipset 120. In general, the chipset 120 operates as an interface between a host bus 110 and a peripheral bus 135. The peripheral bus 135 may include a Peripheral Component Interconnect (PCI) bus or any other type of bus architecture.

Processors $105_1$–$105_N$ are any microprocessors. In this embodiment, processors $105_1$–$105_N$ are the PENTIUM® or PENTIUM Pro™ microprocessors manufactured by Intel Corporation at Santa Clara, Calif.

Chipset 120 typically includes a cache DRAM controller (CDC), a peripheral bus controller, and a data path unit (DPU). The Peripheral Component Interconnect (PCI) Bridge (PB) provides a set of host-to-PCI and PCI-to-host bus transaction translations.

The host bus 110 is a bus that can support transactions to a number of connected processors. Host bus 110 may be referred to as a parallel bus or multiprocessor bus because it supports parallel operations and multiple processors. It is contemplated that host bus 110 operates in a pipelined manner to increase efficiency. However, these features should not be construed to limit the teachings of the present invention. The present invention can be utilized if there is only one processor connected to the host bus 110.

The peripheral bus 135 provides a communication path between the processors $105_1$–$105_N$ or main memory element 130 and a plurality of peripheral devices $151_1$–$151_K$ ("K" being a positive whole number) and a plurality of 32-bit peripheral devices $152_1$–$152_L$ ("L" being a positive whole number). These peripheral devices may include I/O devices such as disk controller, data entry interface circuits, and pointing device controllers.

The expansion bus 155 provides a communication path between the peripheral bus 135 and a plurality of expansion peripheral devices $160_1$–$160_M$ ("M" being a positive whole number). The expansion bus 155 may include an Industry Standard Architecture (ISA) bus or an Extended Industry Standard Architecture (EISA) bus.

The signals and the bus protocol described herein are for the INTEL® Architecture (IA) processors. An example of such processors is the PENTIUM Pro processor. The background and specifications of the PENTIUM Pro™ processor are described in the PENTIUM Pro™ Family Developer's Manual, Volume 1: Specifications, published by Intel in January 1996. The present invention, however, is practiced with any processors and bus protocols.

In the following description, signal and pin names are used with the following notation. A "#" symbol indicates an active low signal. Bit numbers are shown in square brackets (e.g., [63:0]). A suffix "B" indicates a binary number, a suffix "H" indicates a hexademinal number. When signal values are referenced in tables, a "0" indicates inactive and a "1" indicates active. "0" and "1" do not reflect voltage levels. For example, an entry of "1" in the table for the ADS# signal means that the ADS# signal is active, with a low voltage level. A bus agent is any device that connects to the processor bus including the processors themselves. A particular bus agent can have one or more of several roles in a transaction. For example, a requesting agent is the agent that issues the transaction, an addressed agent is one that is addressed by the transaction, a snooping agent is a caching bus agent that observes, or snoops, bus transactions to maintain cache coherency. A snooper is another term for a snooping agent.

Signal names are described as follows:

BUS CLOCK: The clock of the processor as observed on the external bus.

CORE CLOCK: The internal clock of the processor.

ADS#: Address Strobe.

REQ[m:n]#: Request command signals from "n" (least significant bit) through "m" (most significant bit).

HITM#: Hit Modified.

TRDY#: Target Ready.

TRDYS#: Target Ready S.

DBSY#: Data-bus Busy.

D[m:n]#: Data signals from "n" (least significant bit) through "m" (most significant bit).

DEP[m:n]#: Data bus Error Correcting Code (ECC) protection signals from n (least significant bit) through m (most significant bit).

DRDY#: Data-Phase data-ready signal.

DRDYS#: Data-Phase data-ready S signal.

DSZ[m:n]#: Data size signals from "n" ((least significant bit) through "m" (most significant bit).

RS[m:n]#: Response status signals from "n" (least significant bit) through "m" (most significant bit).

The following signals are used in encoding the data size: TRDY#, TRDYS#, DRDY#, DRDYS# and DSZ[1:0]#. TRDYS# and DRDYS# are two new signals defined for the dynamic sizing in the present invention. The data size can be asserted during a bus cycle, or configured at power-on reset.

Table 1 shows the encoding of the DSZ[1:01# field. There are 3 valid data size configurations: (1) 32-bit only, (2) 64-bit/32-bit inter-operable, and (3) 64-bit only. The DSZ [1:0]# signals are driven in the second clock of the Request phase.

TABLE 1

Data size based on DSZ[1:0]#

| DATA TRANSFER WIDTH | DSZ1# | DSZO# | COMMENTS |
|---|---|---|---|
| 64-bit | 0 | 0 | Support 64-bit transfer only |
| 64/32-bit | 1 | 0 | Supports 64/32-bit inter-operable transfers |
| 32-bit | 1 | 1 | Supports 32-bit transfers only |

For power-up configuration, the DRDY# and DRDYS# signals are samples at the active-to-inactive transition of the RESET# signal. Table 2 shows the data size configuration based on the DRDY# and DRDYS# signals.

TABLE 2

Encoding of DSZ[1:0]# based on DRDY# and DRDYS#.

| BUS WIDTH | DRDY# | DRDYS# | DSZ# |
|---|---|---|---|
| 64/32 | 0 | 0 | 10 |
| 64 | 0 | 1 | 00 |
| 32 | 1 | 0 | 11 |
| 64 | 1 | 1 | 00 |

Agents with different data sizes support different groupings of TRDY#, TRDYS#, DRDY#, and DRDYS# as follows:

64-bit only agents support TRDY# and DRDY# signals;

32-bit only agents support TRDYS# and DRDYS# signals; and 64-bit/32-bit agents support TRDY#, TRDYS#, DRDY#, and DRDYS# signals.

Table 3 shows the designations of data size based on combinations of DSZ[1:0]#, TRDY#, TRDYS#, DRDY#, DRDYS#, REQa0#, and HTM#. A signal can be interpreted differently depending on whether the associated device is an observer or a driver. The entries in Table 3 use the format Observer (Driver). In other words, the level interpreted by the driver is shown in parentheses.

TABLE 3

Logic Levels based on combinations of DSZ#, REQaO#, HITM#, TRDY#, TRDYS#, DRDY#, and DRDYS#.

| From Requester | | From Snooper | From Response Agent | | From Data Transfer Agent | | Data Size | Data Transfer Agent |
|---|---|---|---|---|---|---|---|---|
| DSZ# | REQa0# | HITM# | TRDY# | TRDYS# | DRDY# | DRDYS# | | |
| 00 (00) (64b only) | X(1),X(0) | X(1),X(0) | 1(1) | X(N) | 1(1) | X(N) | 64 | ALL |
| 11(11) (32b only) | X(1),X(0) | X(1),X(0) | X(N),X(0) | 1(1) | X(N),X(0) | 1(1) | 32 | ALL |
| 10(10) (64b/32b) | 0(0) | 0(0) | X(1),X(0) | X(1),X(0) | 1(1) | 0(0) | 64 | Response |
| | 0(0) | 0(0) | X(1),X(0) | X(1),X(0) | 0(N) | 1(1) | 32 | |
| | 1(1) | X(1),X(0) | 1(1) | 1(1) | 1(1) | 0(0) | 64 | Request |
| | 1(1) | X(1),X(0) | 1(1) | 0(0)$^a$ | 1(1) | 0(0) | 64 | |
| | 1(1) | X(1),X(0) | 0(N) | 1(1) | 0(0) | 1(1) | 32 | |
| | X(1),X(0) | 1(1) | 1(1) | 0(0)$^a$ | 1(1) | 0(0) | 64 | Snoop |
| | X(1),X(0) | 1(1) | 0(N),0(0) | 1(1) | 0(N) | 1(1) | 32 | |
| | X(1),X(0) | 1(1) | 1(1) | 1(1) | 1(1) | 0(0) | 64 | |
| | X(1),X(0) | 1(1) | 1(1) | 1(1) | 0(N) | 1(1) | 32 | |

$^a$DSZ# = 10 and TRDY#/TRDYS# = 10 is not a valid system architecture. However, the processor behaves as shown.

In Table 3, N refers to a no drive condition.

The determination of the data bus size is summarized in the following algorithm:
 Case (DSZ[1:0]#)
  00: Data bus=64 bits; ignore TRDYS# and DRDYS#;
  11: Data bus=32 bits; ignore TRDY# and DRDY#;
  10: /*Data bus depends on (TRDY#, TRDYS#) and (DRDY#, DRDYS#)*/
   Case (TRDY#, TRDYS#) (Response agent capability)
    01: Data bus=32 bits;
    11: Case(DRDY#, DRDYS#) (Snooping agent capability)
     01: Data bus=32 bits;
     10: Data bus=64 bits;
    End case
   End case
  End case.

Considerations for Error Correcting Code (ECC)

When the data bus width is 64-bit, data is transferred in 8-byte data chunks D[63:0]# along with 8-bit ECC, DEP [7:0]#. When the data bus width is 32-bit, the 64-bit data chunk is split into two 4-byte chunk transfers using the D[31:0]# signals, with the lower address chunk being transferred first. The 8-bit ECC bits DEP[7:0]# signals in 64-bit data bus width are also split into two 4-bit chunks using the DEP[3:0]# signals.

The ECC functionality of 32-bit data bus width is the same as the ECC functionality of 64-bit data bus width. Single bit error correction and double bit error detection is done on a 64-bit basis. So when the data bus width is 32-bit, for a read cycle, two 32-bit chunks will be assembled and then go through the ECC computation. In addition, two 4-bit DEP[3:0]# will be assembled to 8 ECC bits for checking if there is any data transfer error. For a write cycle, the 8 ECC bits computed within the processor will be driven out 4 bits at a time with each 32-bit data.

Referring to FIGS. 2A and 2B, the timing diagrams illustrating the write transactions with 64-bit/32-bit interoperability are shown, respectively.

FIG. 2A shows the timing diagram for a simple write transaction for a 64-bit data. In the Request Phase, ADS# is asserted at clock 1. The DSZ[1:0]# signals are driven at clock 2. In this example, DSZ[1:0]#=10B indicating the processor is capable of handling both 64-bit and 32-bit data transfers. At clock 4, the TRDY# and TRDYS# signals are returned 11B indicating that the data bus size is 64-bit. The processor drives out 64-bit data D[63:0]# and 8-bit DEP [7:0]# at clock 6. Since there is only one 64-bit chunk, the DBSY# signal is not asserted. The DRDY# signal is asserted at clock 6. The RS[2:0]# signals are driven at clock 7.

FIG. 2B shows the timing diagram for a simple write transaction for a 32-bit data. In the Request Phase, ADS# is asserted at clock 1. The DSZ[1:0]# signals are driven at clock 2. In this example, DSZ[1:0]#=10B indicating the processor is capable of handling both 64-bit and 32-bit data transfers. At clock 4, the TRDY# and TRDYS# signals are returned 01B indicating that the data bus size is 32-bit. The processor drives out two 32-bit data chunks at the lower data signals D[31:0]# and the 8-bit DEP[3:0]# at clocks 6 and 7, respectively. Since there are two 32-bit chunks, the DBSY# signal is asserted at clock 6. The DRDYS# signal is asserted at clocks 6 and 7. The RS[2:0]# signals are driven at clock 7.

Figure 3:
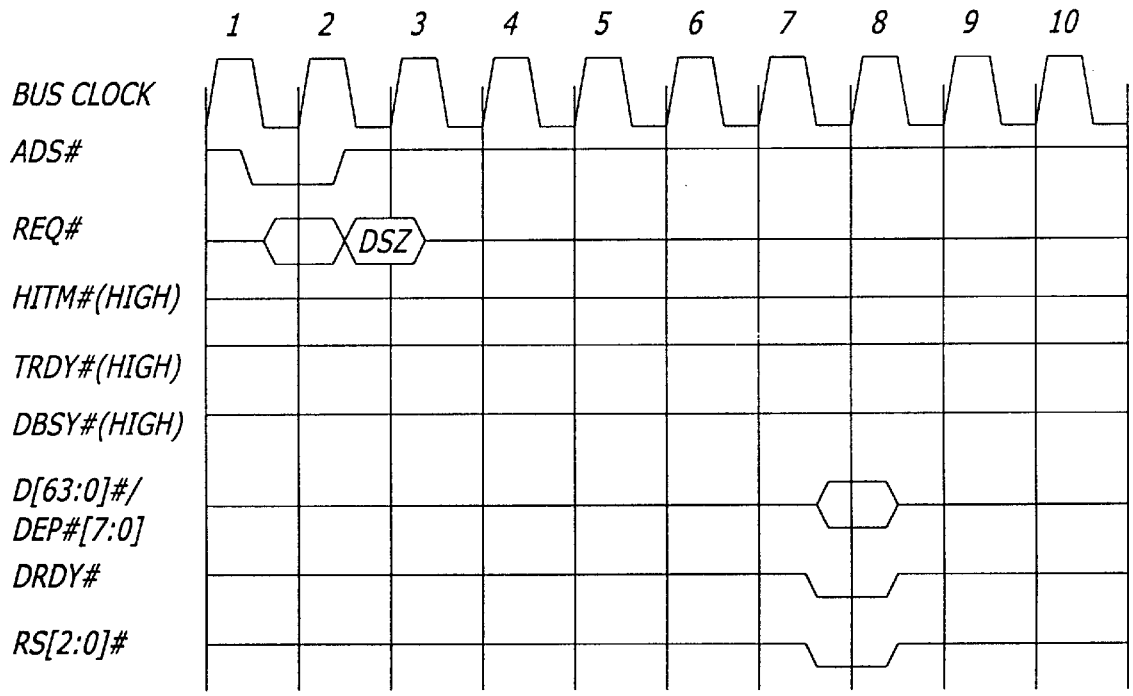
FIG. 3A is a timing diagram illustrating a read transaction in the 64-bit transfer mode.
FIG. 3B is a timing diagram illustrating a read transaction in the 32-bit transfer mode.
Figure 3:
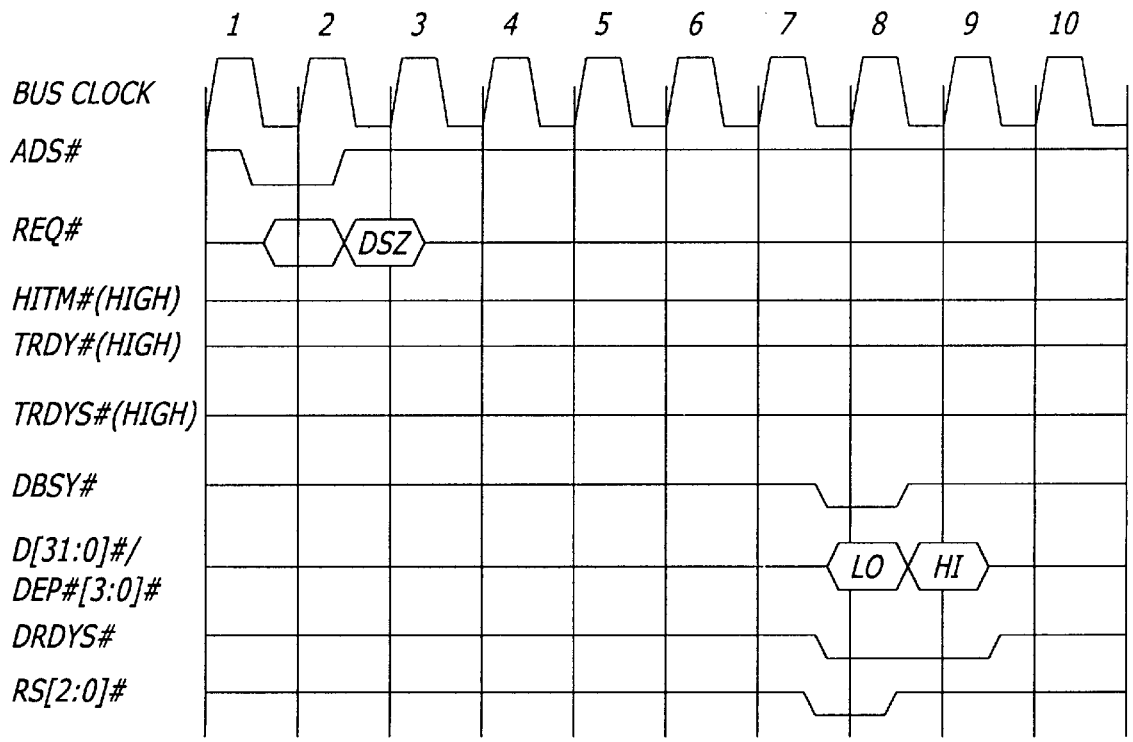

Referring to FIGS. 3A and 3B, the timing diagrams illustrating the read transactions with 64-bit/32-bit interoperability are shown, respectively.

FIG. 3A shows the timing diagram for a read transaction for a 64-bit data. In the Request Phase, ADS# is asserted at clock 1. The DSZ[1:0]# signals are driven at clock 2. In this example, DSZ[1:0]#=10B indicating the processor is capable of handling both 64-bit and 32-bit data transfers. The DRDY# signal is asserted low at clock 7, indicating that the data bus size is 64-bit. Since there is only one 64-bit chunk, the DBSY# signal is not asserted. The RS[2:01# signals are driven at clock 7.

FIG. 3B shows the timing diagram for a read transaction for a 32-bit data. In the Request Phase, ADS# is asserted at clock 1. The DSZ[1:0]# signals are driven at clock 2. In this example, DSZ[1:0]#=10B indicating the processor is capable of handling both 64-bit and 32-bit data transfers. The DRDYS# signal is asserted low at clock 7, indicating that the data bus size is 32-bit. Since there are two 32-bit chunks, the DBSY# signal is asserted at clock 7 for two clock cycles. The RS[2:0]# signals are driven at clock 7.

Figure 4:
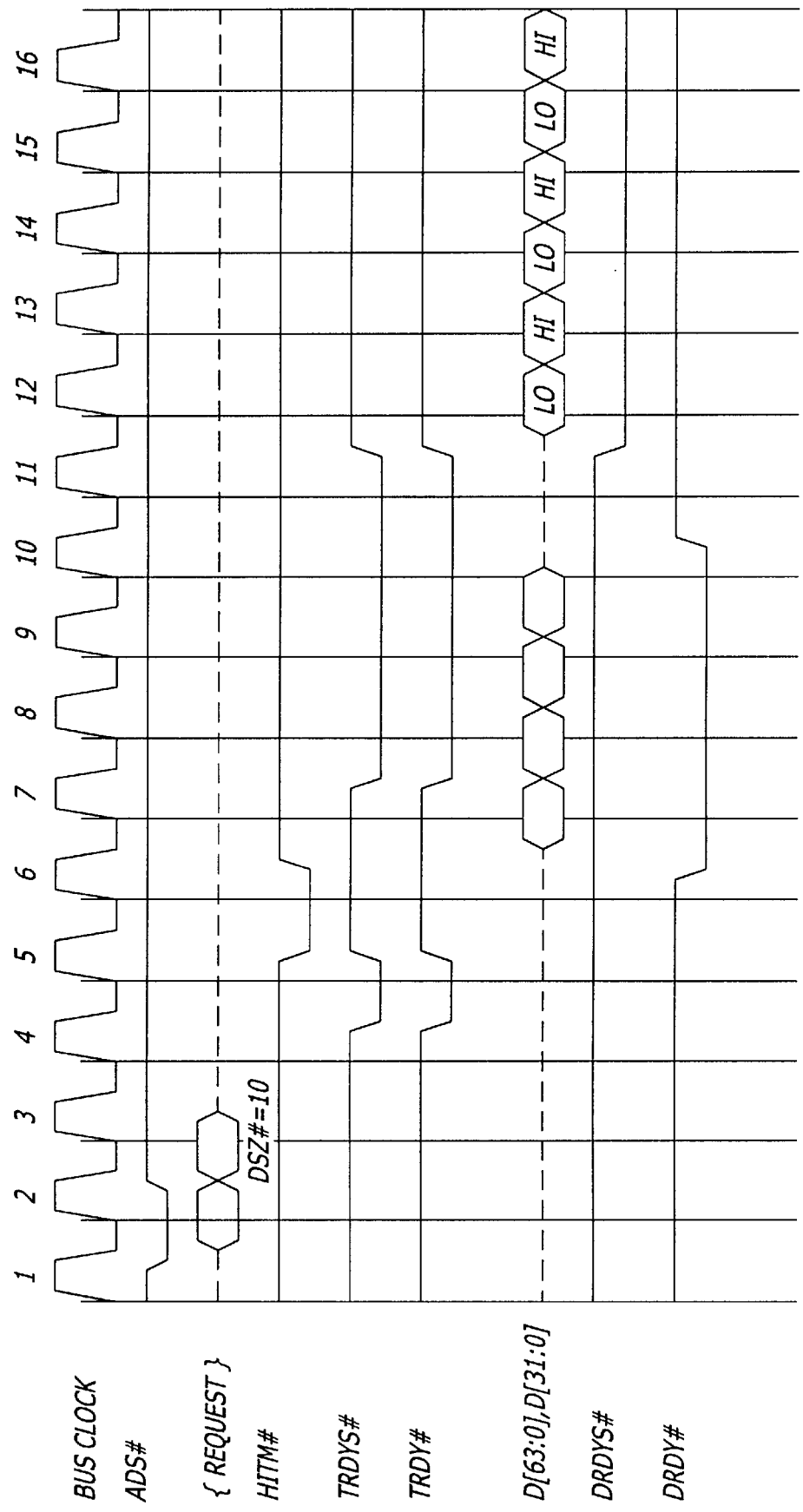
FIG. 4 is a timing diagram illustrating a line write transaction with implicit write back in 64-bit/32-bit transfer mode.

Referring to FIG. 4, a timing diagram illustrating a write line transaction with implicit write back in a 64-bit/32-bit inter-operable system. In the Request Phase, ADS# is asserted at clock 1. The DSZ[1:0]# signals are driven at clock 2. In this example, DSZ[1:0]#=10B indicating the processor is capable of handling both 64-bit and 32-bit data transfers. At clock 4, TRDYS# and TRDY# are returned low indicating that the target agent can accept both 64-bit and 32-bit data. Four 64-bit write transactions from clock 6 to clock 9 occur with DRDY# being asserted. A snooper asserts HITM# at clock 5 indicating an implicit write back. The snooper indicates that it can support only 32-bit data by asserting DRDYS# starting at clock 11. Eight 32-bit data transfers occur starting from clock 11.

Power On Configuration

Power-on configuration for a 64/32 bit inter-operable bus agent is done by sampling DRDY# and DRDYS# signals on active-to-inactive transition of RESET#. BUSWIDTH[1:0] are used for bus width configuration.

Figure 5:
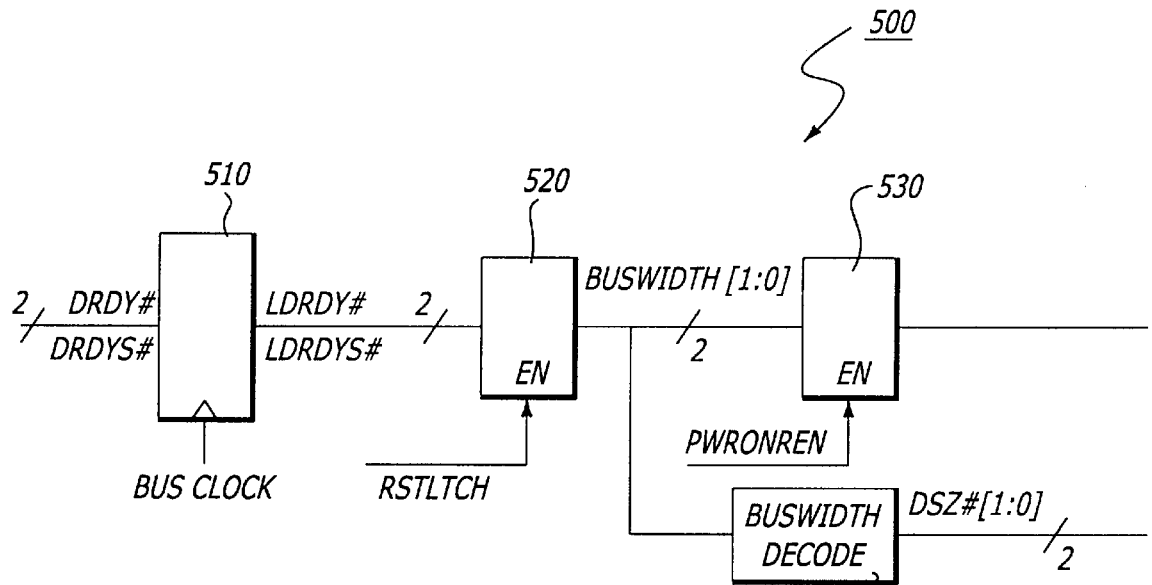

Referring to FIG. 5, a circuit diagram 500 illustrating the DSZ[1:0]# generation and power-on register is shown. Register 510 samples the DRDY# and DRDYS# signals at BUS CLOCK to produce LDRDY# and LDRDYS# signals, respectively. Latch 520 stores LDRDY# and LDRDYS# at active-to-inactive transition of RESET# by the RSTLTCH signal to produce the BUSWIDTH[1:0] signals. Bus Width Decode 540 decodes the two bits BUSWIDTH[1:0] into the corresponding DSZ[1:0]# signals in accordance to Table 2. Latch 530 stores the BUSWIDTH[1:0] signals at Power-on Read Enable by the PWRONREN signal.

Referring to FIG. 6, a circuit diagram 600 illustrating one embodiment in accordance to the teachings of the present invention is shown.

Figure 2:
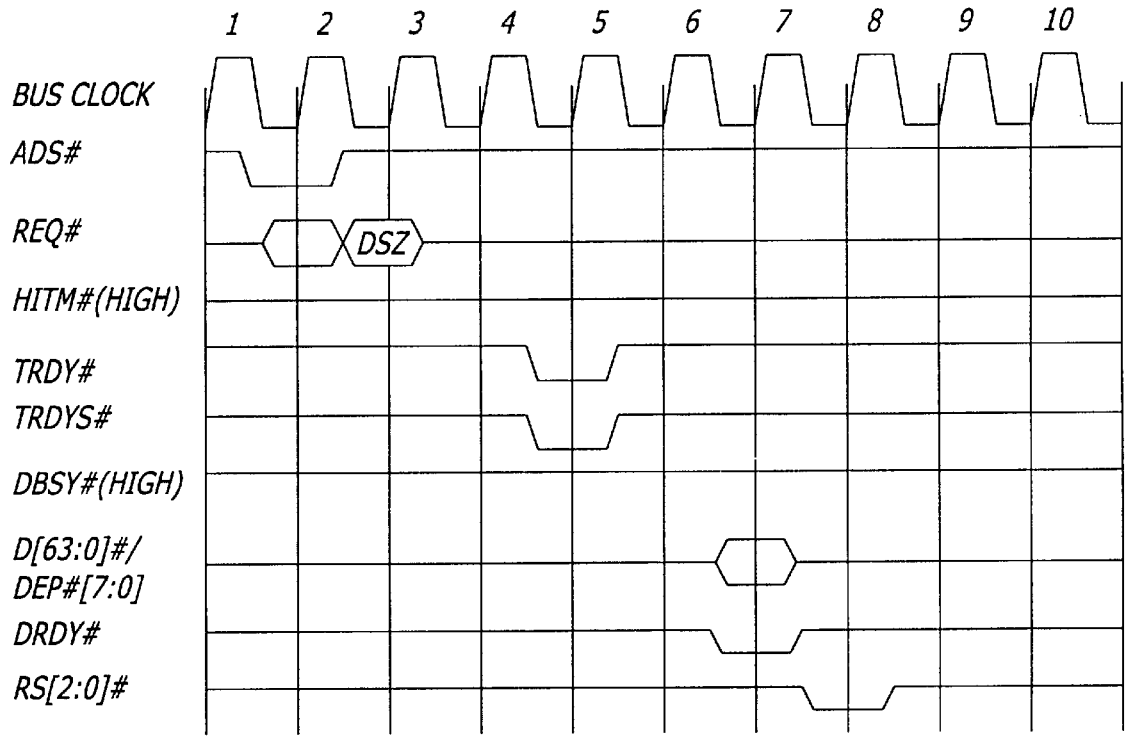
Figure 2:
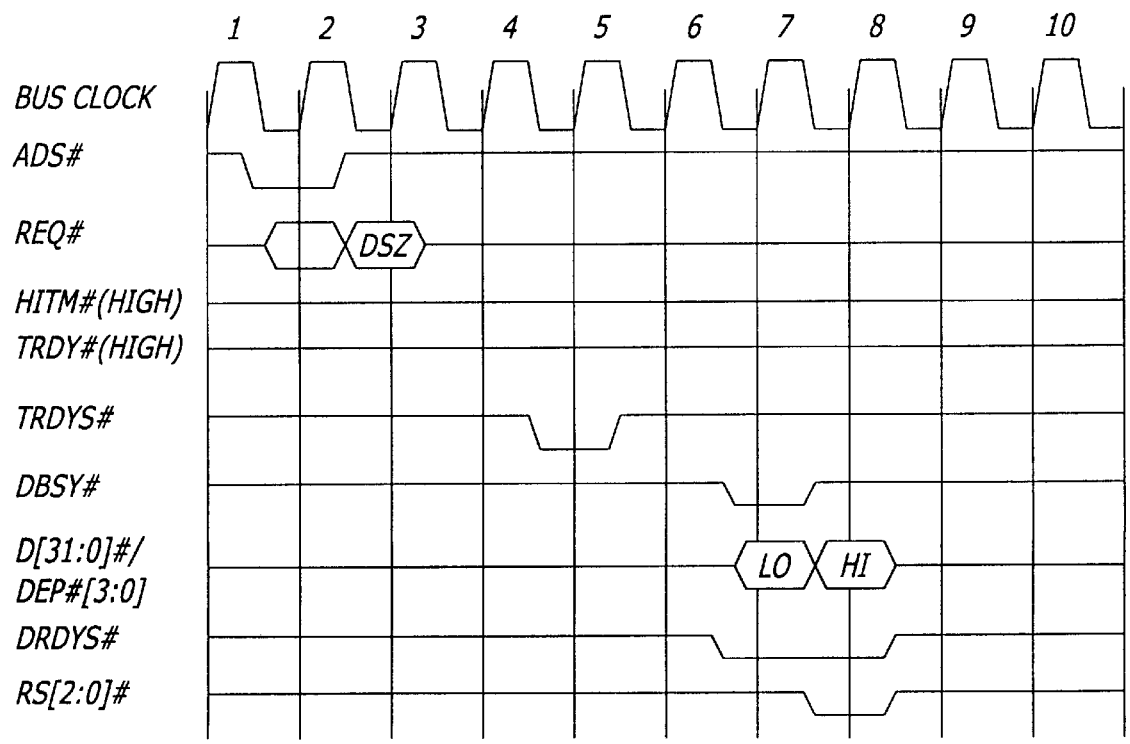

FIG. 6-1 shows one embodiment of the Data and ECC Section 601. Data and ECC Section 601 provides interface to the D[63:0]# and DEP[7:0]# signals. FIG. 6-2 shows one embodiment of the Buffer Section 602. Buffer Section 602 interfaces to the internal buffer queues through the BDAT[63:0] signals and EBUFDAT[63:0] signals. The D[63:0]# signals form the bidirectional external data bus. The DEP[7:0]# signals form the bidirectional data ECC protection bus. There are several read and write paths between the external buses formed by the D[63:0]# and DEP[7:0]# signals and the internal buffer queues through the BDAT[63:0] and EBUFDAT[63:0] signals.

In the embodiment shown in FIG. 6-1 and FIG. 6-2, there are three read paths and two write paths. In the read paths, Read Data Select 655, Read ECC-Data Select 628, and Read ECC Select 642 process the input data and error protection signals to select the proper size for the data and the ECC protection signals. In the write paths, Write Data Select 632 and Write ECC Select 648 process the output data to select the proper size for the data and the ECC protection signals. REG1 610, REG2 620, REG3 630, REG4 640, REG5 650, and REG6 660 are registers clocked by the BUS CLOCK signal.

In the first read path, the D[63:0]# signals are clocked into REG1 610 and buffered by Buffer 615. Buffer 615 is controlled by the EN1 signal. The INTDAT[63:0] signals form the internal bidirectional data bus. In this read data path, the INTDAT[63:0] signals go to Read Data Select 655 as shown in FIG. 6-2. The output of Read Data Select 655 is clocked into REG6 660 which produce the latched LINTDAT[63:0] signals. Exclusive-OR gates 668 receive the LINTDAT[63:0] and CORVECT[63:0] signals and produce outputs to be latched on REG7 670. REG7 670 produces the EBUFDAT[63:0] signals to go to an internal ECC Data buffer queue.

In the second read path, Read ECC-Data Select 628 processes the INTDAT[63:0] signals to produce the input signals to ECC Logic 645. ECC Logic 645 performs error correcting code computation and syndrome generation. ECC Logic 645 produces the ECCSYN[7:0] signals. ECC Correct Vector 665 receives the syndrome ECCSYN[7:0] signals and generate the CORVECT[63:0] signals. CORVECT[63:0] signals are used to correct the erroneous bit in the LINTDAT[63:0] signals.

In the third read path, the DEP[7:0] signals are clocked into REG4 640 to produce the LDEP[7:0] signals. Read ECC Select 642 receives the LDEP[7:0] signals and produce the properly selected signals to ECC-Logic 645.

In the first write path, the BDAT[63:0] signals from an internal buffer memory are clocked into REG3 630 to produce the LBDAT[63:0] signals. Write Data Select 632 receives the LBDAT[63:0] signals to produce the OUTBDAT[63:0] signals which are buffered by Buffer 635. Buffer 635 is controlled by the EN3 control signal. In this write path, the output INTDAT[63:0] signals are clocked into REG2 620. The outputs of REG2 620 are buffered by Buffer 625 to produce the D[63:0]# signals. Buffer 625 is controlled by the EN2 control signal.

In the second write path, ECC Logic 645 produces the ECCCHK[7:0] signals. Write ECC Select 648 receives the ECCCHK[7:0] signals to produce the OUT_ECCCHK[7:0] signals. The OUT_ECCCHK[7:0] signals are clocked into REG5 650 to become the DEP[7:0]# output signals.

Figure 7:
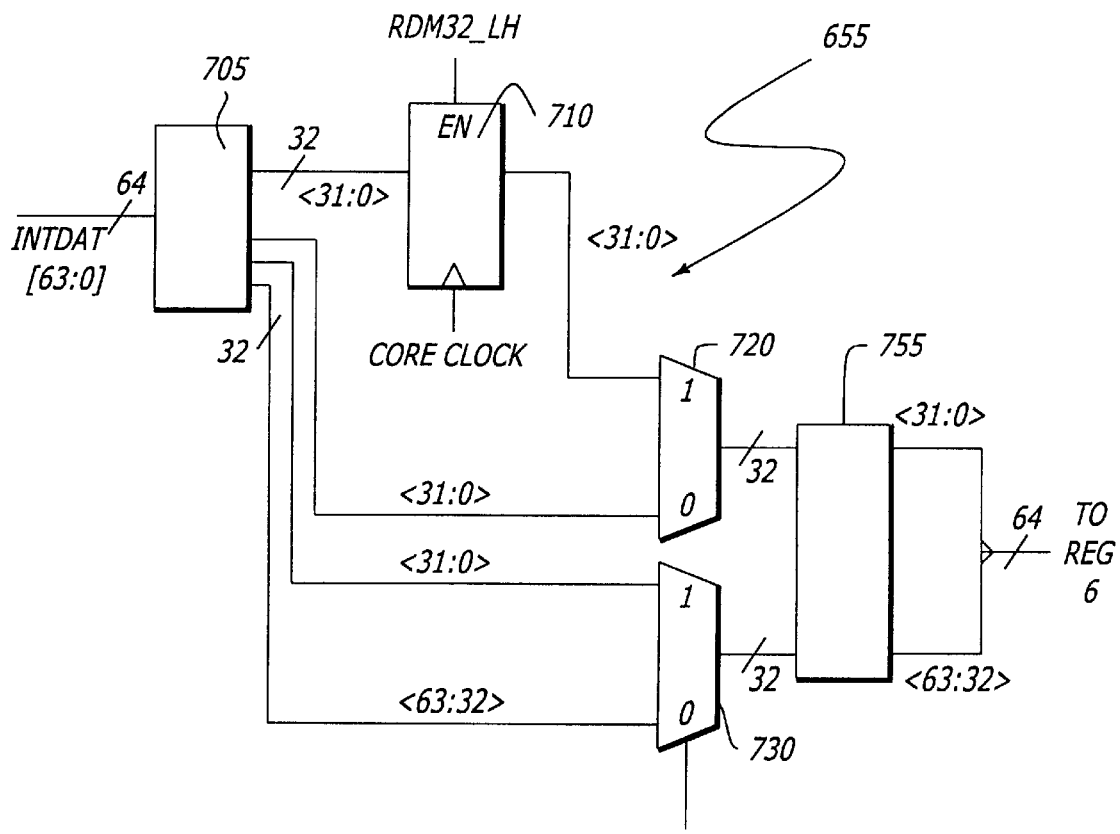
FIG. 7 is a circuit diagram illustrating one embodiment of a Read Data Select block.

Referring to FIG. 7, one embodiment illustrating Read Data Select 655 is shown. Separator 705 separates the INTDAT[63:0] signals into two groups of signals: INTDAT[63:32] and INTDAT[31:0] signals. Separator 705 can be implemented in a number of ways. The simplest method is to hardwire the signal lines from the inputs to the outputs. This method requires no additional hardware or delay but it does not provide flexibility in arranging the order of the signal groups on the bus. Another method is to use dynamically configurable switches such as crossbar switches. This method provides a high degree of flexibility but adds extra hardware and delay. Yet another method is to use a set of multiplexers to select the proper input lines. This method is flexible but requires some hardware and delay. Other separators in other circuits have the same implementation methods. In one embodiment shown in FIG. 7, the lower half of the INTDAT[63:0] signals from Separator 705 is connected to Register 710, 0-input to multiplexer 720, and 1-input to multiplexer 730. The upper half of the INTDAT[63:0] signals from Separator 705 is connected to the 0-input to Multiplexer 730.

Register 710 stores the lower 32 data bits of the INTDAT[63:0] signals. Multiplexers 720 and 730 are two-to-one 32-bit multiplexing devices. Both multiplexers 720 and 730 are controlled by the RDM32 signal. Each multiplexer 720 and 730 has two inputs: a 1-input and a 0-input. When the RDM32 control signal is high, the 1-input is selected when the RDM32 control signal is low, the 0-input is selected. The RDM32 signal is high when the 32-bit mode is selected, and low when the 64-bit mode is selected.

When the 32-bit mode is selected, Read Data Select 655 assembles two 32-bit data chunks, which are read in two consecutive cycles, into one 64-bit data. According to the timing diagram shown in FIG. 2B, the first read 32-bit data is the lower half data occupying the lower half signal lines. The second read 32-bit data is the upper half of the INTDAT [63:0] signals occupying the lower half signal lines. The lower half data is latched at register 710. Register 710 is enable controlled by the RDM32_LH signal. When the RDM32_LH signal is asserted, indicating the 32-bit mode and the lower half data are selected, the lower half of the INTDAT[63:0] signals is latched at the core clock. The output of register 710 is connected to the 1-input of multiplexer 720.

When RDM32 is asserted high, the latched lower 32-bit data and the unlatched upper 32-bit data are transferred to become a 64-bit data to REG6 660. When the 64-bit mode is selected, RDM32 is low. Both multiplexers 720 and 730 select the 0-inputs, transferring the unlatched 64-bit data from the INTDAT[63:0] signals to Combiner 755. Combiner 655 combines the two halves and transfers REG 660. There are several methods to implement Combiner 755 The simplest method is to hardwire the signals. This method requires no hardware and incurs no propagation delay. However, it does not provide flexibility. Another method is to use two 32-bit two-to-one multiplexers. This method provides flexibility to swap the two halves but incurs some delay and requires extra hardware.

Figure 8:
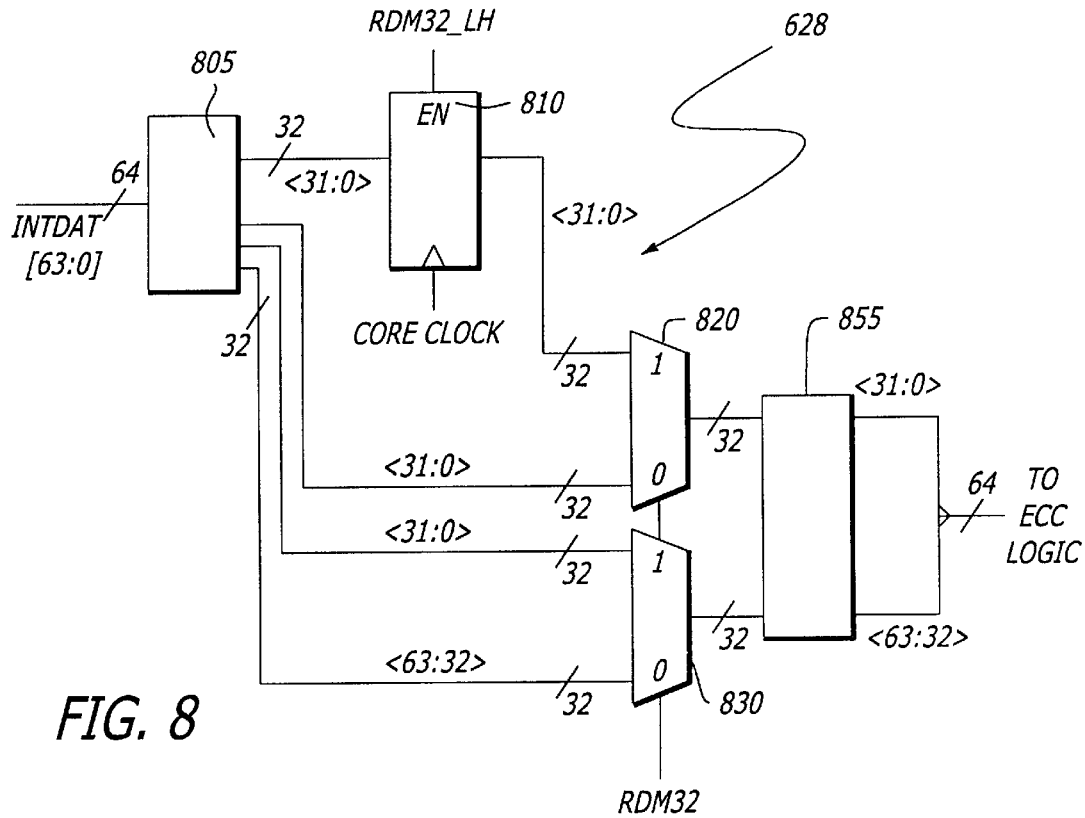
FIG. 8 is a circuit diagram illustrating one embodiment of a Read ECC Data Select block.

Referring to FIG. 8, one embodiment illustrating the Read ECC-Data Select 628 is shown. Separator 805 separates the INTDAT[63:0] signals into two groups of signals: INTDAT [63:32] and INTDAT[31:0] signals. Read ECC-Data Select 628 is identical to Read Data Select 655. In other words, in 32-bit read mode, it assembles two consecutive 32-bit data chunks into one 64-bit data. In 64-bit mode, it simply transfers the unlatched 64-bit INTDAT[63:0] to the ECC Logic 645. Register 810 is used to latch the lower half of the INTDAT[63:0]. Two 32-bit two-to-one multiplexers 820 and 830 select the two 32-bit-data or the one 64-bit data according to the RDM32 control signal. Combiner 855 combines the two halves to ECC Logic 645. Combiner 855 can be implemented as Combiner 755.

Figure 9:
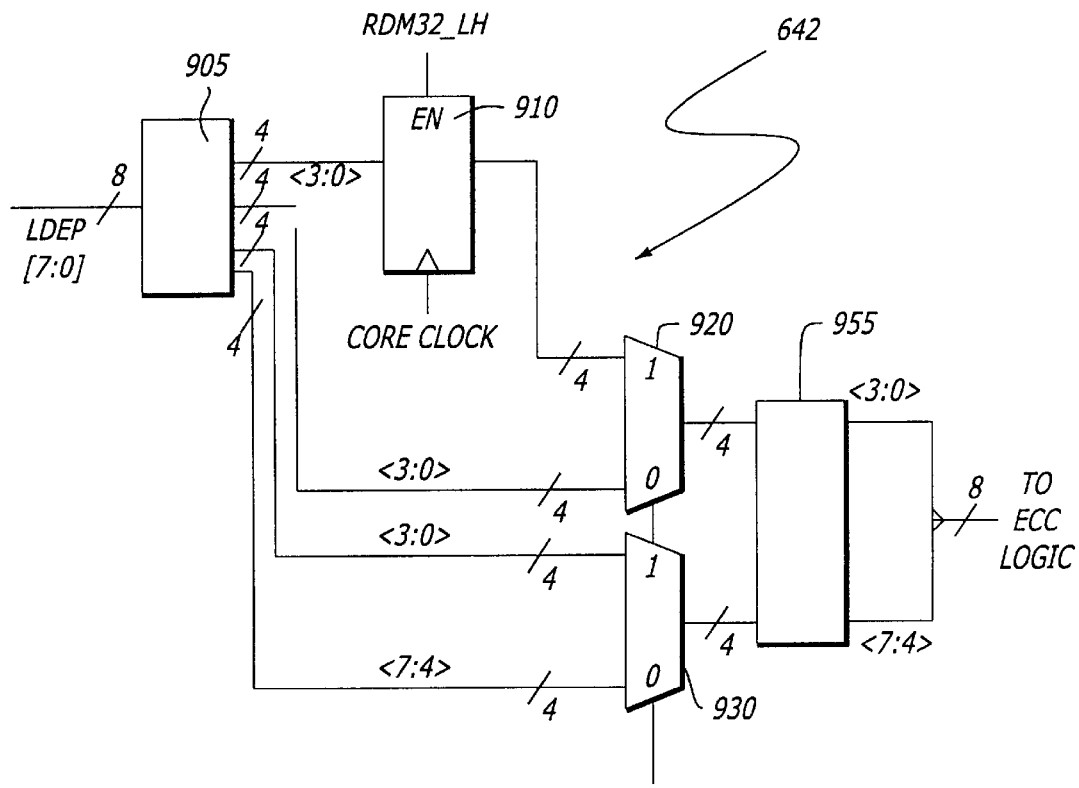
FIG. 9 is a circuit diagram illustrating one embodiment of a Read ECC Select block.

Referring to FIG. 9, one embodiment illustrating the Read ECC Select 642 is shown. The hardware structure is similar to Read Data Select 655 and Rad ECC-Data Select 628, except that the word size is 8-bit for the Data Error Correcting Code protection bits. Separator 905 separates the LDEP[7:0] signals into two groups: LDEP[7:4] and LDEP [3:0] signals. Register 910 latches the lower 4 bits of the LDEP[7:0] signals at the core clock. The latching is enabled by the M32_LH signal. The M32_LH signal is asserted high when the 32-bit mode and the lower half is selected. The two multiplexers 920 and 930 are 4-bit two-to-one multiplexers controlled by the RDM32 signal. When the 32-bit mode is selected, the 8-bit ECC bits are transferred in two consecutive cycles as shown in the timing diagram of FIG. 2B. The lower 4 bits are latched at the register 910. When RDM32 is high indicating that the 32-bit mode is selected, Multiplexers 920 and 930 select the latched lower 4 bits occupying the lower 4 signal lines and the unlatched upper 4 bits occupying the lower 4 signal lines to form 8 bits to ECC Logic 645. When RDM32 is low indicating that the 64-bit mode is selected, Multiplexers 920 and 930 transfer the unlatched 8 bits of the LDEP[7:0] signals to Combiner 955. Combine 955 combines the two halves to ECC Logic 645. Combiner 955 can be implemented as combiner 755 except that only 4 bits are used.

Figure 10:
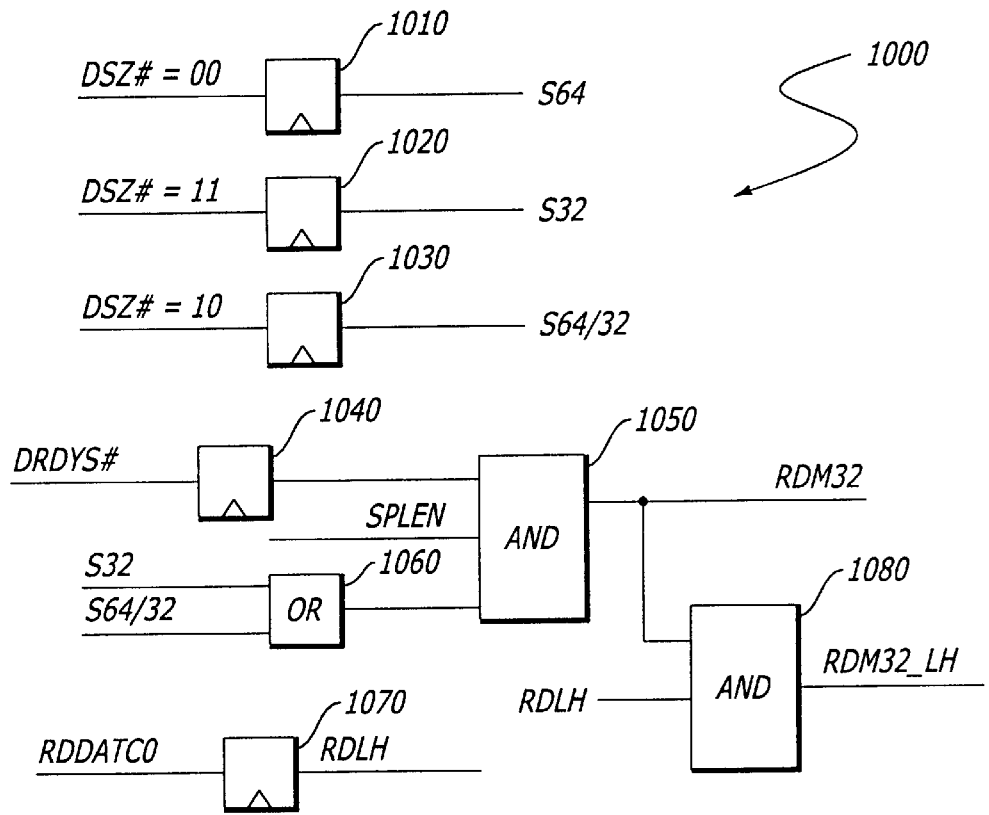
FIG. 10 is a circuit diagram illustrating one embodiment of a control circuit for the read path.

Referring to FIG. 10, one embodiment of a circuit diagram 1000 illustrating the control circuit for the Read Data Select 655, Read ECC-Data Select 628, and Read ECC Select 642 is shown. The two main control signals are RDM32 and RDM32_LH. Logic blocks 1010, 1020, 1030, 1040, and 1070 have registers to latch the input signals. Block 1010 encodes DSZ[1:0]# and asserts S64 true when DSZ[1:0]#=00B indicating that the 64-bit mode is selected. Block 1020 encodes DSZ[1:0]# and asserts S32 true when DSZ[1:0]#=11B indicating that the 32-bit mode is selected. Block 1030 encodes DSZ[1:0]# and asserts S64/32 true when DSZ[1:0]#=10B indicating that both 64-bit and 32-bit modes are selected. Block 1040 latches the DRDYS# signal. Block 1060 is an OR gate receiving the two inputs S32 and S64/32. Block 1050 is an AND gate receiving three inputs: the latched DRDYS# signal, the SPLEN signal, and the output of the OR gate 1060. Block 1050 generates the RDM32 control signal.

The SPLEN signal is a qualifying sample enable signal. This signal is derived from the internal core clock signal and the read/write control signal to ensure that the RDM32 is asserted during a read transaction. The reason for this qualifier is that ECC logic 645 is shared by both read and write transactions.

Block 1070 receives the RDDATCO to generates the RDLH signal. The RDM32_LH signal is then output of the AND gate 1080.

Figure 11:
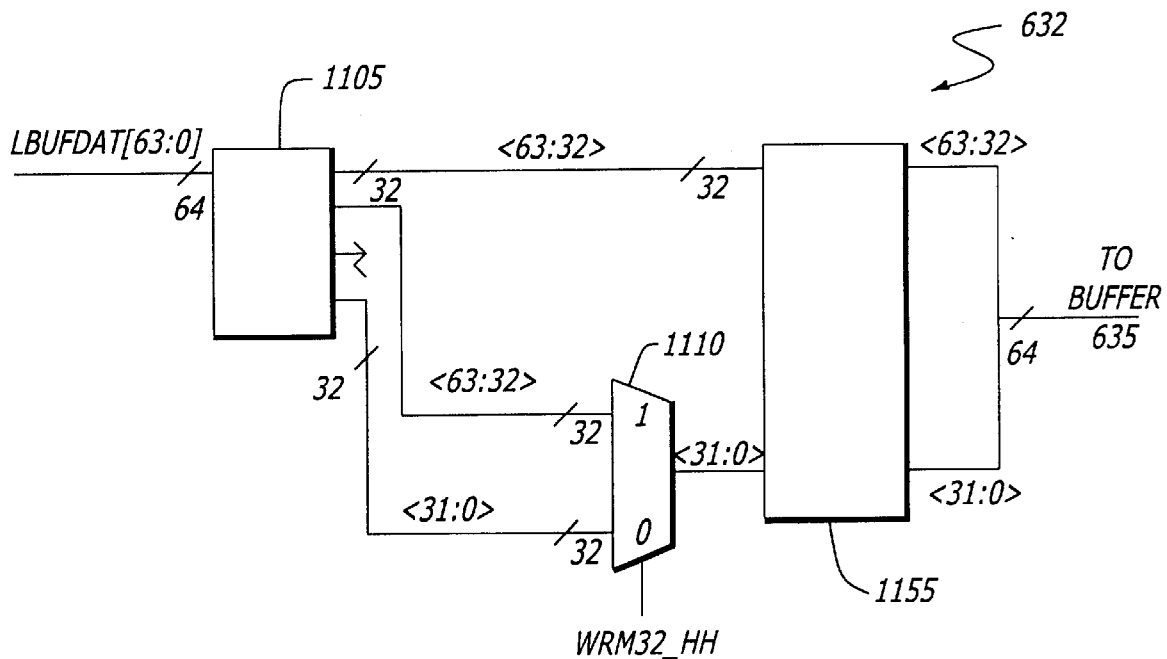
FIG. 11 is a circuit diagram illustrating one embodiment of a Write Data Select block.

Referring to FIG. 11, a circuit diagram illustrating one embodiment of Write Data Select 632 is shown. Separator 1105 separates the LBUFDAT[63:0] into two groups: the LBUFDAT[63:32] and LBUFDAT[31:0] signals. The upper half and the lower half of the LBUFDAT[63:0] signals are connected to the 1- and 0- inputs of multiplexer 1110. Combiner 1155 combines the two halves into 64-bit to buffer 635. Combiner 1155 can be implemented as Combiner 755. Multiplexer 1110 is a 32-bit two-to-one multiplexer controlled by the WRM32_HH control signal. When the WRM32_HH control signal is high, indicating that the 32-bit mode and the high half chunk are selected, multiplexer 1110 selects the upper LBUFDAT[63:32] signals. When the WRM32_HH control signal is low, indicating that either (i) the 32-bit mode and the low half chunk are selected, or (ii) the 64-bit mode is selected, multiplexer 1110 selects the lower LBUFDAT[31:0] signals. The condition when the WRM32_HH signal is low corresponds to the timing diagram of FIG. 3A at clock 7, or the timing diagram of FIG. 3B at clock 7. The condition when the signal WRM32_HH signal is low corresponds to the timing diagram of FIG. 3B at clock 8.

Figure 12:
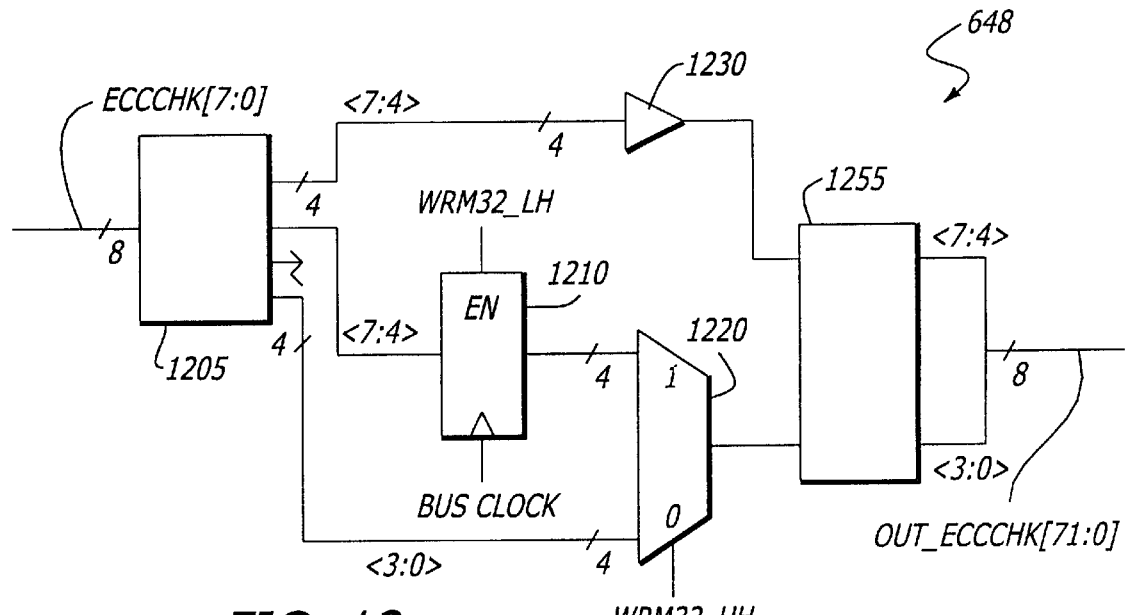
FIG. 12 is a circuit diagram illustrating one embodiment of a Write ECC Select block.

Referring to FIG. 12, a circuit diagram illustrating one embodiment of Write ECC Select 648 is shown. The ECCCHK7:0] signals represent the 8-bit ECC check bits from ECC Logic 645. Separator 1205 separates the ECCCHK[7:0] signals into two groups: the ECCCHK[7:4] and ECCCHK[3:0] signals. The upper half of the ECCCHK [7:0] signals is latched at register 1210. Multiplexer 1220 selects the latched upper half of the ECCCHK[7:0] signals, i.e., the ECCCHK[7:4] signals, and the unlatched lower half of the ECCCHK[7:0] signals, i.e. the ECCCHK[ 3:0] signals. Multiplexer 1220 is a 4-bit two-to-one multiplexer selected by the WRM 32_HH control signal. Buffer 1230 buffers the upper half of the ECCCHK[7:0] signals. The outputs of buffer 1230 and multiplexer 1220 go to Combiner 1255. Combiner 1255 combines the two halves to 8-bits forming the OUT_ECCCHK[7:0] signals. Combiner 255 can be implemented as Combiner 955. When the WRM32_HH control signal is low, indicating that either (i) the 32-bit mode and the low half chunk are selected, or (ii) the 64-bit mode is selected, multiplexer 1220 transfers the unlatched lower half of the ECCCHK[7:0] signals to the OUT_ECCCHK[7:4] signals through Combiner 1255. When the WRM32_HH control signal is high, indicating the 32-bit mode and the high half chunk are selected, multiplexer 1220 transfers the latched upper half of the ECCCHK[7:0] signals to the OUT_ECCCHK[3:0] signals through Combiner 1255.

Latch 1210 is enabled by the WRM32_LH signal. The WRM32_LH signal is high when the 32-bit mode and the low half chunk are selected. Therefore, latch 1210 only latches the ECCCHK[7:4] signals when the 32-bit mode is selected and when the low half chunk data is driven out. This corresponds to timing diagram of FIG. 3B at clock 7. The reason to use latch 1210 is explained in the following. When the 32-bit mode is selected, the low half chunk is driven first, and then the high half chunk as shown at clocks 7 and 8 of the timing diagram of FIG. 3B. At clock 7, ECC Logic 645 received the entire 64-bit INTDAT[63:0] at the input (although only the lower half is being driven out). ECC Logic 645 computes the 8-bit ECC based on this 64-bit data. By latching the upper 4 bits of the 8-bit ECC, Write ECC Select 648 retains the proper 8-bit ECC.

At clock 8, ECC Logic 645 receives two identical halves representing the LBUFDAT[63:32] signals at the INTDAT[63:0] signals as the result of the processing done by Write Data Select 632. Therefore, the ECC computing is incorrect. If latch 1210 were allowed to latch the ECCCHK[7:4] signals at this time, it would latch incorrect result. Therefore, latch 1210 only latches the ECCCHK[7:4] at the time when the low half is driven out.

Figure 13:
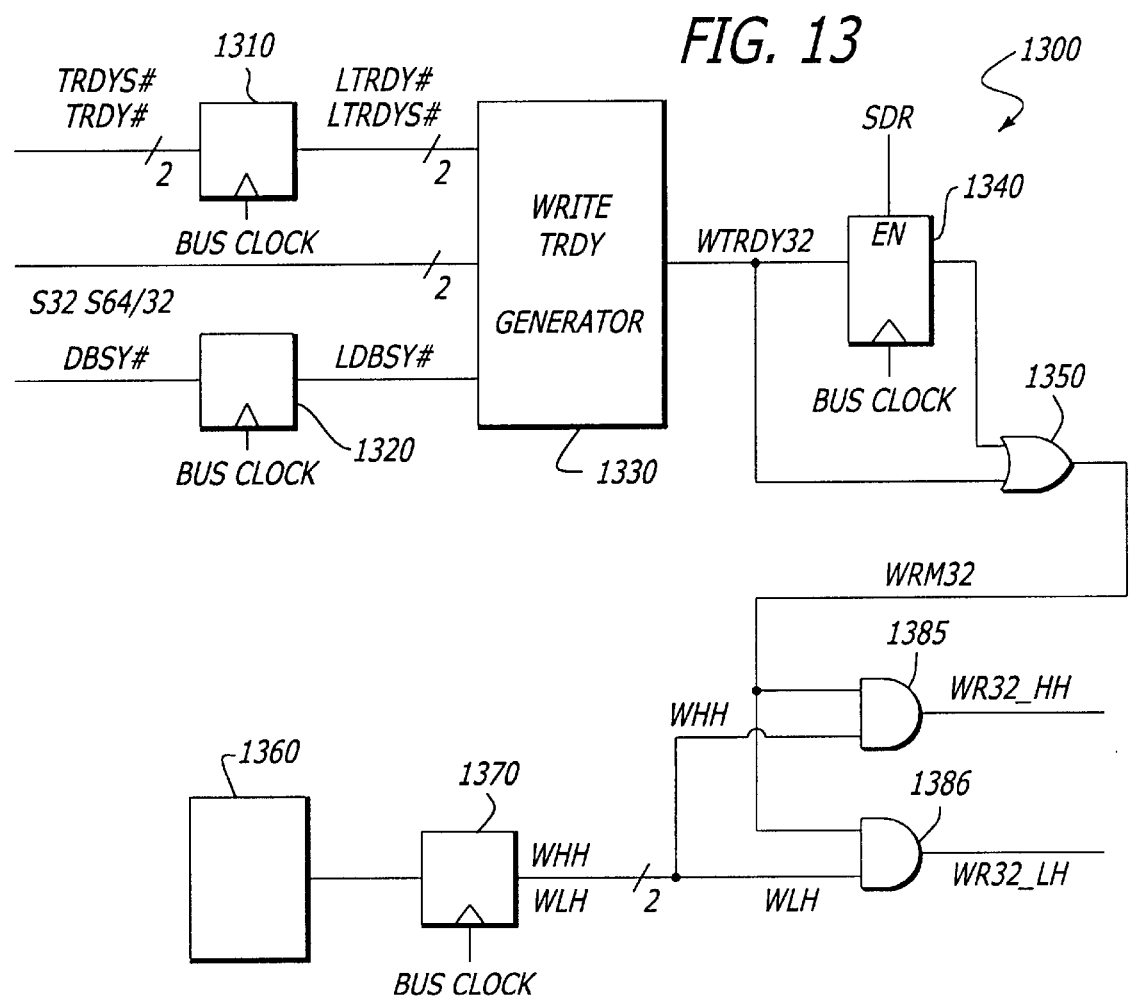
FIG. 13 is a circuit diagram illustrating one embodiment of a control circuit for the write path.

Referring to FIG. 13, a circuit diagram illustrating one embodiment of the Write Control Circuit 1300 for Write Data Select 632 and Write ECC Select 648 is shown. The Write Control Circuit 1300 generates the WRM32_HH and WRM32_LH signals. Register 1310 latches the TRDY# and TRDYS# signals to produce the LTRDY# and LTRDYS# signals, respectively. Register 1320 latches the DBSY# signal to produce the LDBSY# signal. Write TRDY Generator 1330 receives as inputs the LTRDY#, LTRDYS#, S32, S64/32, and LDBSY# signals. The S32 and S64/32 signals are the same as the S32 and S64/32 signals shown in FIG. 10. Write TRDY Generator 1330 produces the WTRDY32 signal. The logic equation to generate the WTRDY32 signal is as follows:

WTRDY32=((S32<RDYS#)|(S64/32 &!LTRDYS#) & LTRDY#)) & (!LDBSY#)

where &, |, and ! denote the logic AND, OR, and INVERSION operators, respectively.

Register 1340 latches the WTRDY32 signal at BUS CLOCK. Register 1340 is enabled by the SDR signal. The SDR signal is asserted when the processor is ready to do a write cycle, either request-initiated or snoop-initiated. The latched WTRDY32 and the unlatched WTRDY32 signals are ORed by OR gate 1350 to produce the WRM32 control signal. Logic block 1360 and register 1370 generates the WHH and WLH signals. The WLH signal is asserted high when there is a valid low 32-bit write cycle. The WHH signal is asserted high when there is valid high 32-bit write cycle. In the 32-bit mode, the low 32-bit chunk is generated first followed by the high 32-bit chunk. Therefore WLH and WHH are complementary with each other.

AND gate 1385 receives the WRM32 and WHH signals to generate the WR32_HH signal. AND gate 1386 receives the WRM32 and WLH signals to generate the WR32_LH signal.

Control circuit 1300 ensures that the TRDYS# is sampled at the proper time, such as when DBSY# is not asserted and the processor has request-initiated or snoop-initiated transaction. In addition, the WRM32 signal is asserted for the entire period of the write data transfer.

Figure 14:
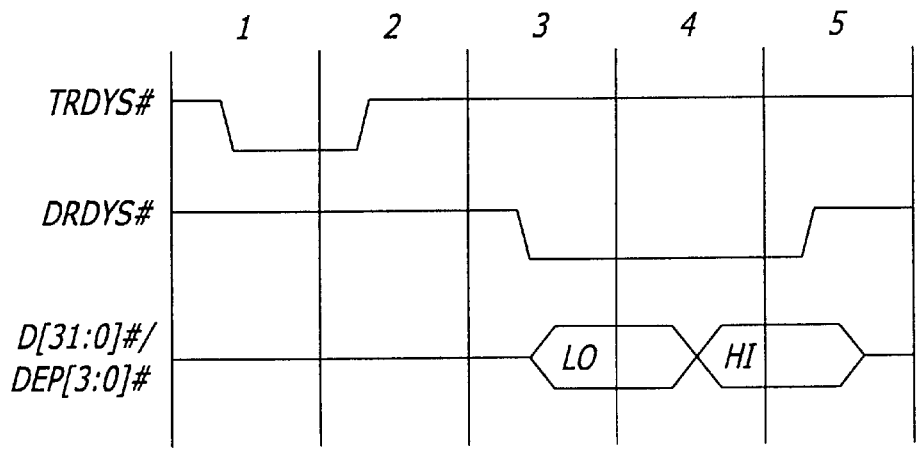
FIG. 14 is a timing diagram showing the fastest write data transfer for a 32-bit mode after TRDYS# is returned.

Referring to FIG. 14, an illustrative timing diagram showing the fastest delay time to drive out the D[31:0]# and/or DEP[3:0]# signals. As shown, this fastest delay time is two clocks after the TRDYS# signal is asserted. This is because the processor needs to determine the bus size mode at clock 2 to set the correct state machine for the proper data transfer.

Figure 15:
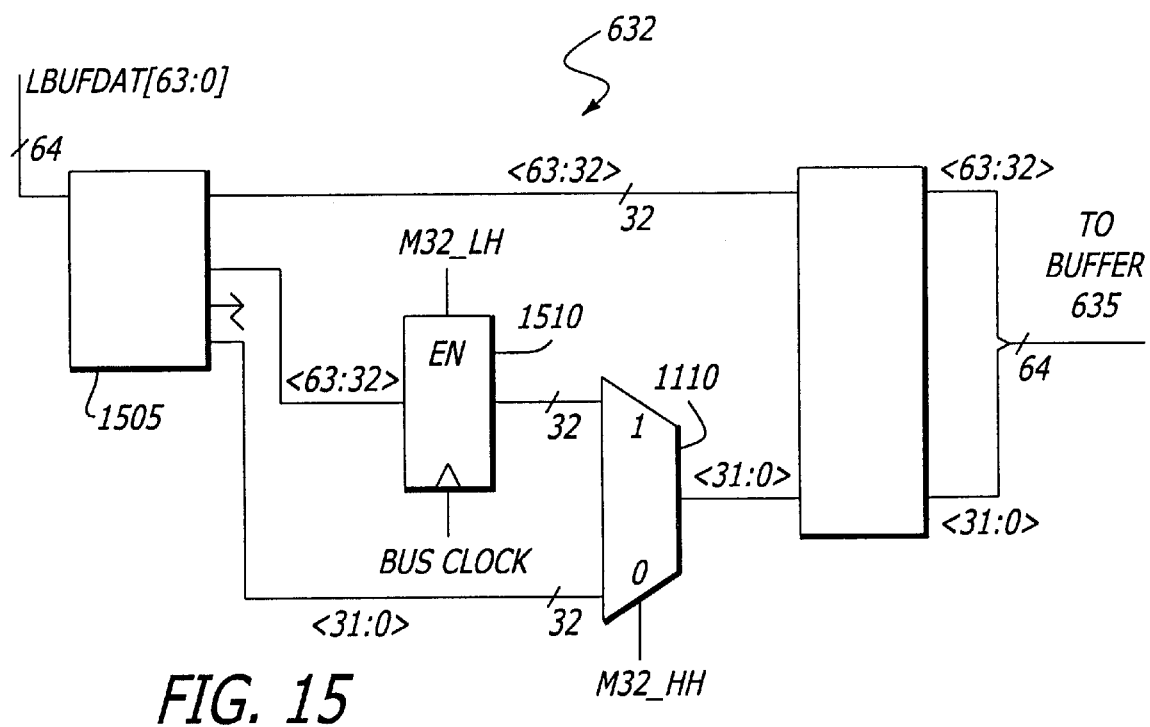
FIG. 15 is a circuit diagram illustrating one embodiment of a "Fetch Once" circuit for a Write Data Select block.

Referring to FIG. 15, a circuit diagram illustrating an alternative embodiment of the Write Data Select 632. In this alternative embodiment, a register 1510 is used to latch the upper half of the LBUFDAT[63:0] signals before going to multiplexer 1110. This alternative embodiment is referred to the Fetch Once option.

The Fetch Once option allows the fetching of 64-bit data from the internal buffer memory to occur once rather than twice as discussed earlier. Each fetching request causes the internal buffer to be discharged to drive the 64-bit internal bus. This process may consume power. Therefore, the Fetch Once option saves some power consumption compared to the Fetch Twice. However, as shown in FIG. 15, this Fetch Once option requires a 32-bit register 1510 which takes up area and consumes additional power.

Figure 16:
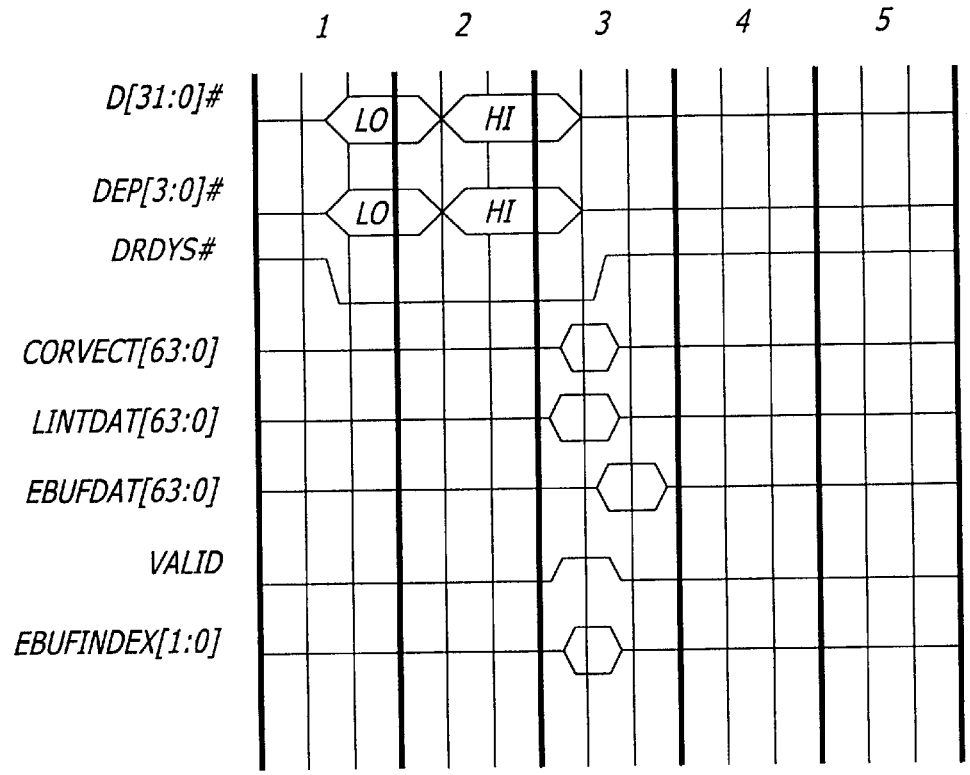
FIG. 16 is a timing diagram illustrating a read data transfer.

Referring to FIG. 16, an illustrative timing diagram showing a read transaction for the 32-bit mode is shown. At clock 1, the lower half of the 64-bit-data and the lower half of the 8-bit ECC are driven onto the D[31:0]# and DEP[3:0]# signals, respectively. The DRDYS# signal is also driven low at clock 1 indicating a 32-bit transfer. At clock 2, the upper half of the 64-bit data and the upper half of the 8-bit ECC are driven onto the same D[31:0]# and DEP[3:0]# signals, respectively. The DRDYS# signal is also asserted at clock 2. The CORVECT[63:0] and LINTDAT[63:0] signals are valid during the first core clock in clock 3. The VALID signal is asserted and the EBUFINDEX[1:0] signals are driven at the first core clock in clock 3. The EBUFINDEX[1:0] signals are used as index to point to an internal buffer for selecting the proper data chunk. The EBUFDAT[63:0] signals are valid some time at the second core clock of clock 3.

Figure 17:
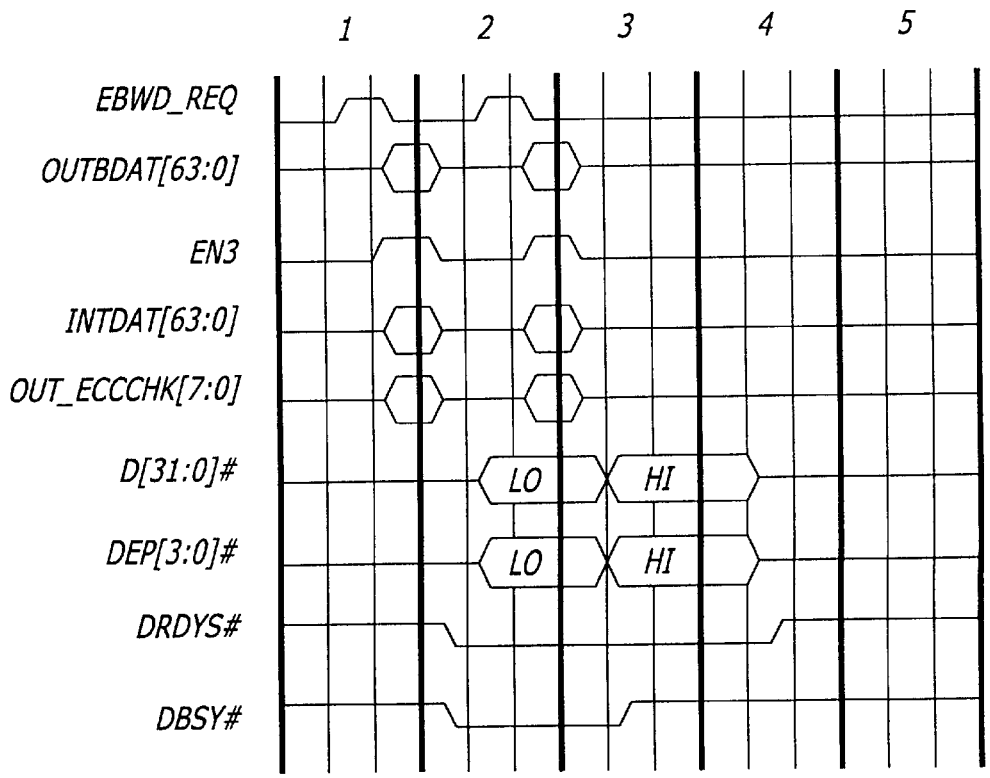
FIG. 17 is a timing diagram illustrating a write data transfer.

Referring to FIG. 17, a timing diagram showing a write transaction for the 32-bit mode is shown. The EBWD_REQ signal is asserted at the second core clock of clock 1 and clock 2 to request the fetching of the 64-bit data from the internal buffer. At the third and final core clock of clock 1 and clock 2, the OUTBDAT[63:0] signals are valid and the EN3 signal is asserted.

The INTDAT[63:0] and OUT_ECCCHK[7:0] signals are generated at the third and final core clock of clock 1 and clock 2 with some combinatorial delay. The D[31:0]# and DEP[3:0]# signals are valid at clock 2 and clock 3 corresponding to the low and high halves, respectively. The DRDYS# is asserted low at clock 2 and clock 3 to indicate a 32-bit transfer mode. The DBSY# is asserted at clock 2.

Tracking Data Transfer

To track the data transfer during burst mode, a 3-bit counter is used for tracking 4-byte transfer (32-bit mode) or 8-byte transfer (64-bit mode). A 3-bit Read Data Counter is used for read cycle and a 3-bit Write Data counter is used for write cycle. A 3-bit Response Size Counter is also used to determine if end of data transfer is reached. For 32-bit mode, all 3-bits of Response Size Counter are compared with the corresponding Data Counter. For 64-bit mode, only the upper 2 bits of the Response Size Counter and the corresponding Data Counter are compared.

Figure 18:
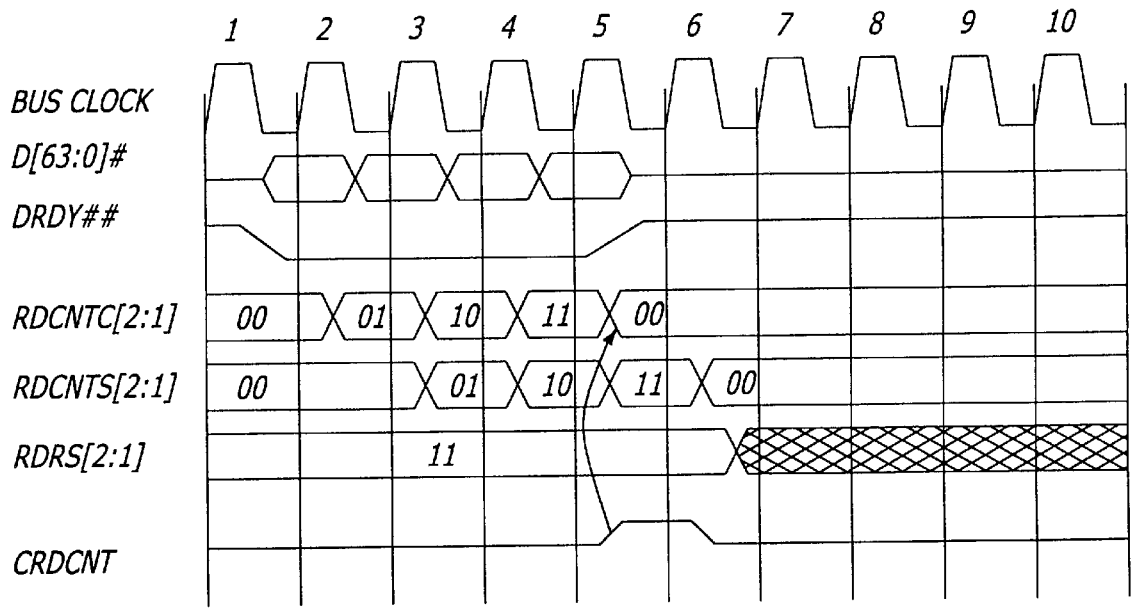
FIG. 18A is a timing diagram illustrating a tracking of line read data transfer for a 64-bit mode.
FIG. 18B is a timing diagram illustrating a tracking of line read data transfer for a 32-bit mode.
Figure 18:
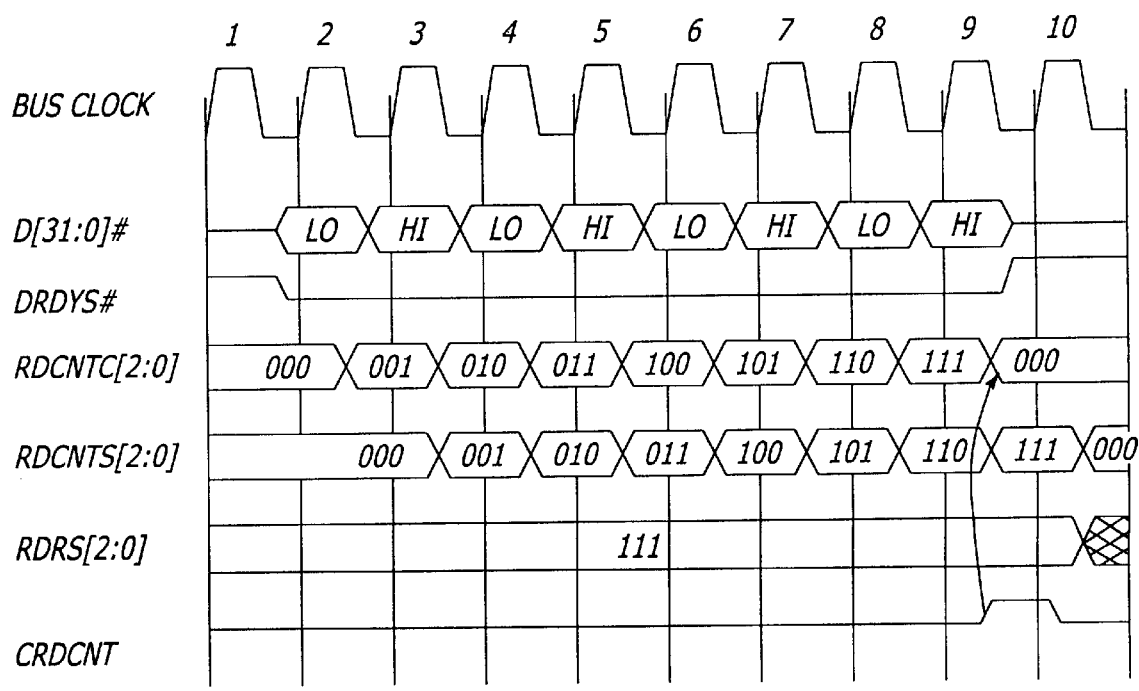

Referring to FIG. 18A, a timing diagram illustrating the tracking of a line read 64-bit data transfer is shown. For 32-byte line read, 4 transfer clocks are needed. The upper 2 bits of the Read Counter C (RDCNTC) and Read Counter S (RDCNTS) increment from 00B, 01B, 10B, to 11B. The upper 2 bits of the RDCNTS[2:1] signals are compared with the upper 2 bits of the Read Response Size (RDRS). When they match at 11B, the CRDCNT signal is asserted high which starts the RDCNTC counter from 00B.

Referring to FIG. 18B, a timing diagram illustrating the tracking of a line read 32-bit data transfer is shown. For 32-byte line read, 8 transfer clocks are needed. The upper 3 bits of the Read Counter C (RDCNTC) and Read Counter S (RDCNTS) increment from 000B, 001B, 010B, to 011B, 100B, 101, B, 110B, 111B. The upper 3 bits of the RDCNTS [2:0] signals are compared with the upper 3 bits of the Read Response Size (RDRS). When they match at 111B, the CRDCNT signal is asserted high which starts the RDCNTC counter from 000B.

Referring to FIG. 19A, a timing diagram illustrating the tracking of a partial line read 64-bit data transfer is shown. The description is similar to that of FIG. 18A except that a partial read instead of a complete line read is shown.

Referring to FIG. 19B, a timing diagram illustrating the tracking of a partial line read 32-bit data transfer is shown. The description is similar to that of FIG. 18B except that a partial read instead of a complete line read is shown.

Figure 20:
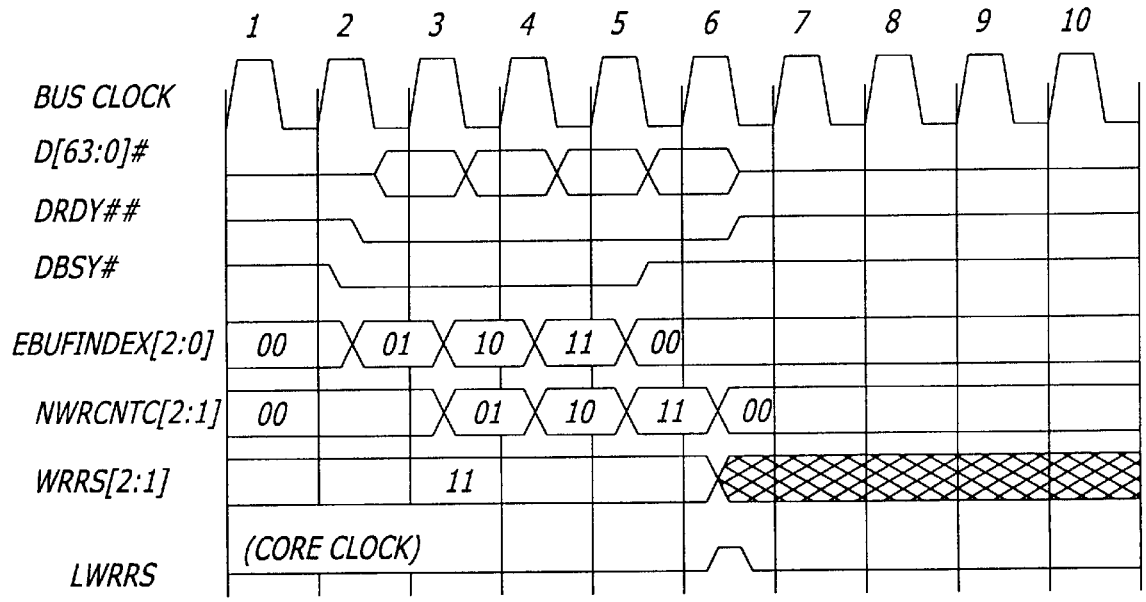
FIG. 20A is a timing diagram illustrating the tracking of line read data transfer for the 64-bit mode.
FIG. 20B is a timing diagram illustrating the tracking of line read data transfer for the 32-bit mode.
Figure 20:
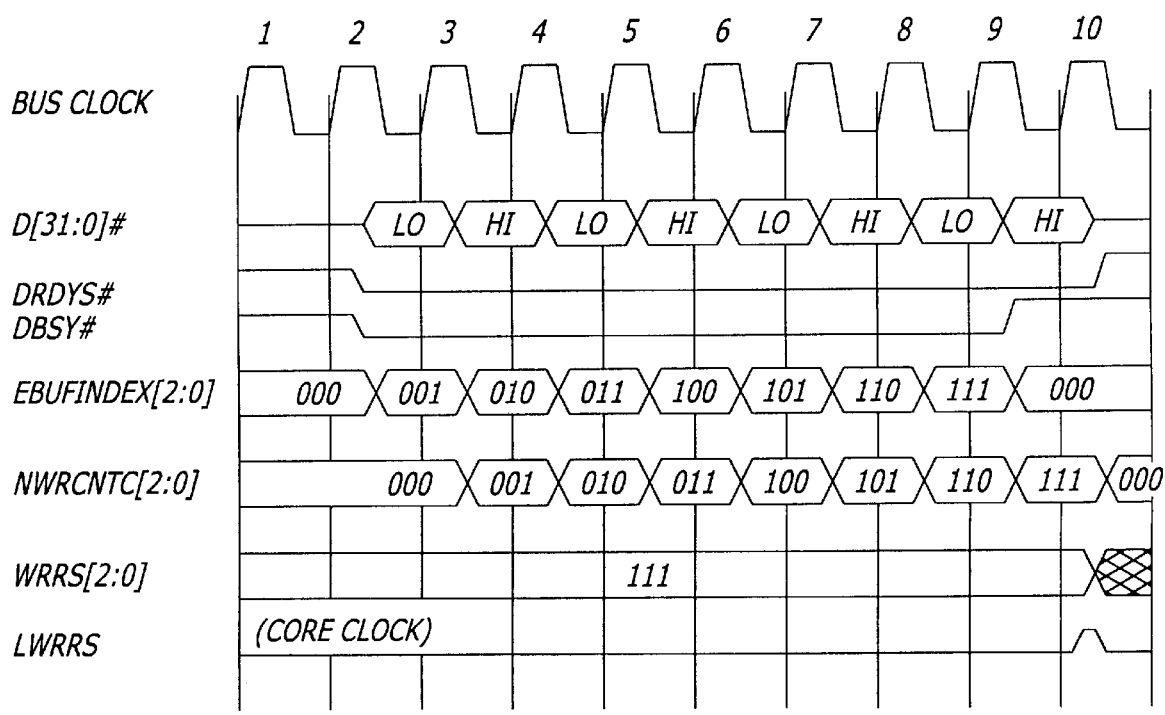

Similarly, FIGS. 20A And 20B show timing diagrams illustrating the tracking of line write 64-bit and 32-bit data transfers, respectively. The WRRS[2:0] signals are output of a 3-bit Write Response Size register. The LWRRS signal is the last write response signal which is asserted at the end of the line write over the core clock period.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A circuit for dynamically sizing a bus transaction on a bus of a first size, the circuit comprising:
   a separator to separate a plurality of signals corresponding to the first size into a first group of signals and a second group of signals forming a separated group of signals, each of the first group and the second group corresponding to a second size;
   a storage element coupled to the separator to delay one of the first and second groups of signals;
   a control circuit to generate a control signal in response to a request for data at an address, the request specifying a data size of the bus transaction independently of the address, the data size including first and second sizes;
   a selecting element coupled to the separator and the storage element to select one of the first and second groups of signals and the delayed group of signal as a selected group of signals, in response to the control signal; and
   a combining element, coupled to the separator and the selecting element to combine the separated group of signals and the selected group of signals.

2. The circuit of claim 1 further comprises:
   a configuring circuit coupled to said control circuit to encode the data size of the bus transaction.

3. The circuit of claim 1 wherein the storage element is a register.

4. The circuit of claim 1 wherein the separator directly connects the plurality of signals to the first group of signals and the second group of signals.

5. The circuit of claim 1 wherein the selecting element includes at least a multiplexer.

6. The circuit of claim 1 wherein the bus transaction is one of a read cycle, a write cycle, and a line write back cycle.

7. The circuit of claim 1 wherein the bus corresponds to one of a data bus and a data error correcting code bus.

8. The circuit of claim 1 wherein the first size is 64-bit and the second size is 32-bit.

9. The circuit of claim 1 wherein the first size is 8-bit and the second size is 4-bit.

10. A method for dynamically sizing a bus transaction on a bus of a first size, the method comprising:
    separating a plurality of signals corresponding to the first size into a first group of signals and a second group of signals forming a separated group of signals, each of the first group and the second group corresponding to a second size;
    delaying one of the first and second groups of signal;
    generating a control signal in response to a request for data at an address, the request specifying a data size of the bus transaction independently of the address, the data size including first and second sizes;
    selecting one of the first and second groups of signals and the delayed group of signal as a selected group of signals in response to the control signal; and
    combining the separated group of signals and the selected group of signals.

11. The method of claim 10 further comprises:
    configuring the data size for the bus transaction.

12. The method of claim 10 further comprises latching one of the first group of signals and the second group of signals.

13. The method of claim 10 wherein separating includes directly connecting the plurality of signals to the first group of signals and the second group of signals.

14. A system comprising:
    a bus of a first size; and
    a processor coupled to said bus, the processor including a circuit for dynamically sizing a bus transaction on the bus, the circuit comprising:
        a separator to separate a plurality of signals corresponding to the first size into a first group of signals and a second group of signals forming a separated group of signals, each of the first group and the second group corresponding to a second size,
        a storage element coupled to the separator to delay one of the first and second groups of signals,
        a control circuit to generate a control signal in response to a request for data at an address, the request specifying a data size of the bus transaction independently of the address, the data size including first and second sizes,
        a selecting element coupled to the separator and the storage element to select one of the first and second groups of signals and the delayed group of signal as a selected group of signals, in response to a control signal indicating a data size of the bus transaction, and
        a combining element, coupled to the separator and the selecting element to combine the separated group of signals and the selected group of signals.

15. The system of claim 14 wherein the circuit further comprises:

a configuring circuit coupled to said control circuit to encode the data size of the bus transaction.

16. The system of claim 14 wherein the circuit further comprises a register coupled to said separator to latch one of the first group of signals and the second group of signals.

17. The system of claim 14 wherein the bus transaction is one of a read cycle, a write cycle, and a line write back cycle.

18. The system of claim 14 wherein the bus corresponds to one of a data bus and a data error correcting code bus.

19. The system of claim 14 wherein the first size is 64-bit and the second size is 32-bit.

20. The system of claim 14 wherein the first size is 8-bit and the second size is 4-bit.

* * * * *

UNITED STATES PATENT AND TRADEMARK OFFICE
CERTIFICATE OF CORRECTION

PATENT NO. : 6,014,720
DATED : January 11, 2000
INVENTOR(S) : Wang et al.

It is certified that error appears in the above-identified patent and that said Letters Patent is hereby corrected as shown below:

In column 4, at line 32, delete "DSZ[1:01" and insert --DSZ[1:0]--.

In column 10, at line 53, delete "645" and insert --64S--.

Signed and Sealed this

Second Day of January, 2001

Attest:

Attesting Officer

Q. TODD DICKINSON
*Commissioner of Patents and Trademarks*